US008682606B2

(12) United States Patent
Horodezky et al.

(10) Patent No.: US 8,682,606 B2
(45) Date of Patent: Mar. 25, 2014

(54) GENERATING VIRTUAL BUTTONS USING MOTION SENSORS

(75) Inventors: Samuel Jacob Horodezky, San Diego, CA (US); Jadine Naomi Yee, San Diego, CA (US); Leonid Sheynblat, Hillsborough, CA (US)

(73) Assignee: QUALCOMM Incorporated, San Diego, CA (US)

( * ) Notice: Subject to any disclaimer, the term of this patent is extended or adjusted under 35 U.S.C. 154(b) by 942 days.

(21) Appl. No.: 12/246,725

(22) Filed: Oct. 7, 2008

(65) Prior Publication Data

US 2010/0088061 A1  Apr. 8, 2010

(51) Int. Cl.
*G01P 15/00* (2006.01)
(52) U.S. Cl.
USPC .......................................................... 702/141
(58) Field of Classification Search
USPC .................................. 702/141; 345/157, 173
See application file for complete search history.

(56) References Cited

U.S. PATENT DOCUMENTS

| | | | |
|---|---|---|---|
| 6,681,176 B2 | 1/2004 | Funk et al. | |
| 6,892,575 B2 | 5/2005 | Nasiri et al. | |
| 6,975,959 B2 | 12/2005 | Dietrich et al. | |
| 7,365,735 B2 | 4/2008 | Reinhardt et al. | |
| 7,938,004 B1 * | 5/2011 | Brunsch et al. | 73/509 |
| 2003/0001863 A1 | 1/2003 | Davidson et al. | |
| 2005/0212766 A1 * | 9/2005 | Reinhardt et al. | 345/157 |
| 2005/0246109 A1 | 11/2005 | Bang et al. | |
| 2006/0106533 A1 | 5/2006 | Hirokawa | |
| 2006/0256076 A1 | 11/2006 | Liou et al. | |
| 2007/0018964 A1 | 1/2007 | Moon et al. | |
| 2007/0103431 A1 | 5/2007 | Tabatowski-Bush | |
| 2007/0139546 A1 | 6/2007 | Baiping et al. | |
| 2007/0175865 A1 | 8/2007 | Zerbini et al. | |
| 2007/0214886 A1 | 9/2007 | Sheynblat | |
| 2007/0247434 A1 | 10/2007 | Cradick et al. | |
| 2007/0248508 A1 | 10/2007 | Gidney et al. | |
| 2008/0011080 A1 | 1/2008 | Merassi et al. | |
| 2008/0120056 A1 | 5/2008 | Haino et al. | |
| 2008/0134784 A1 | 6/2008 | Jeng et al. | |
| 2008/0158176 A1 * | 7/2008 | Land et al. | 345/173 |
| 2008/0174550 A1 | 7/2008 | Laurila et al. | |

(Continued)

FOREIGN PATENT DOCUMENTS

| | | | |
|---|---|---|---|
| CN | 1694044 A | 11/2005 | |
| CN | 1979488 A | 6/2007 | |

(Continued)

OTHER PUBLICATIONS

Alois et al: Physical Shortcuts for Media Remote Controls ICST INETIAN 08. Proceedings of the 2nd International Conference on Intelligent Techonogies for Interactive Enterainment; Jan. 8-10, 2008, Cancun, Mexico, pp. 8PP, XP007911662.

(Continued)

*Primary Examiner* — Tung S Lau
*Assistant Examiner* — Xiuquin Sun
(74) *Attorney, Agent, or Firm* — Linda G. Gunderson

(57) ABSTRACT

An implementation of a system and method for using sensors such as one or more gyroscopes and/or accelerometers to sense input is provided. For example, one or more of such sensors may be use to provide virtual buttons at various areas on the housing of a mobile device, detect a force against the housing, or to detect relative movement of the mobile device.

39 Claims, 13 Drawing Sheets

(56) References Cited

U.S. PATENT DOCUMENTS

| | | |
|---|---|---|
| 2008/0234935 A1 | 9/2008 | Wolf et al. |
| 2009/0303204 A1 | 12/2009 | Nasiri et al. |
| 2010/0136957 A1 | 6/2010 | Horodezky et al. |

FOREIGN PATENT DOCUMENTS

| | | |
|---|---|---|
| EP | 1271288 A2 | 1/2003 |
| EP | 1531598 A2 | 5/2005 |
| JP | 6004208 A | 1/1994 |
| JP | 07098630 | 4/1995 |
| JP | 10254614 A | 9/1998 |
| JP | 2002268622 A | 9/2002 |
| JP | 2003131650 A | 5/2003 |
| JP | 2005317031 A | 11/2005 |
| JP | 2006323859 A | 11/2006 |
| JP | 2007535776 A | 12/2007 |
| JP | 2008052190 A | 3/2008 |
| JP | 2008082818 A | 4/2008 |
| JP | 2008128674 A | 6/2008 |
| JP | 2008141535 A | 6/2008 |
| JP | 2008146619 A | 6/2008 |
| JP | 2010009392 A | 1/2010 |
| KR | 20050104529 A | 11/2005 |
| KR | 20070007329 A | 1/2007 |
| KR | 20070068590 A | 7/2007 |
| TW | I239480 B | 9/2005 |
| TW | I268348 | 12/2006 |
| TW | I291029 B | 12/2007 |
| TW | 200805131 A | 1/2008 |
| WO | 0235460 A1 | 5/2002 |
| WO | 2005093550 A2 | 10/2005 |
| WO | 2005108119 A2 | 11/2005 |
| WO | 2006110532 A2 | 10/2006 |
| WO | 2007127537 A1 | 11/2007 |
| WO | WO2008041975 | 4/2008 |

OTHER PUBLICATIONS

Gemmell J et al: "Telling Stories with Mylifebits" IEEE International Conference on Multimedia and Expo, 2005. ICME 2005. Amsterdam, The Netherlands, Jul. 6-8, 2005, IEEE, Piscataway, NJ, USA, Jul. 6, 2005, pp. 1536-1539, XP010843963 ISBN: 978-0-7803-9331-8 the whole document.

IGN Staff. E3 2006: Seeing The Difference Wiimote vs. PS3-mote. Did Sony just steal a revolution?, IGN E3 Expo Coverage, May 8, 2006, IGN Entertainment Incorporated, http://wii.ign.comlarticleSn05~0587Opl.html.

International Search Report and The Written Opinion—PCT/US2009/066447, International Search Authority—European Patent Office—Feb. 10, 2010.

International Search Report and Written Opinion—PCT/US09/059851, International Searching Authority—European Patent Office, Apr. 9, 2010.

Lawrence I. Charters, Fingerprints: Why you care about the iPhone, Electric Pi Washington Apple PI Journal Online, May 17, 2008, Washington Apple Pi, Ltd., Rockville, MD, htlp:l~.wap.orgljournal/fingerprints/default.htm.

Partial International Search Report PCT/US2009/059851 International Search Authority European Patent Office Feb. 22, 2010.

Yatani K et al: Information Transfer Techniques for Mobile Devices by Toss and Swing Actions Dec. 2, 2004, Mobile Computing Systems and Applications, 2004. WMCSA 2004 Sixth IEEE Workshop on Windermer, Cumbria, UK. Dec. 2-3, 2004. Piscataway, NJ, USA, IEEE, pp. 144-151, XP010757454.

Taiwan Search Report—TW098134022—TIPO—Jan. 4, 2013.

\* cited by examiner

GENERATING VIRTUAL BUTTONS USING MOTION SENSORS

FIELD OF THE INVENTION

The invention relates generally to input controls on handheld mobile devices and more specifically to virtual buttons on a handheld mobile device having one or more motion sensors such as a gyroscope or an accelerometer.

BACKGROUND OF THE INVENTION

Conventional handheld mobile devices, such as mobile telephones, allow an operator to input control commands via mechanical/electrical buttons. These buttons include standalone buttons, keypads and keyboards, and touch screens. These buttons are typically positioned on the front and side surfaces of the mobile device and require mechanical assemblies and electrical wiring to that physical location of the button on the various surfaces. Wiring must be routed from the physical location of the button to control electronics, which monitors an operator's activation of buttons. Additional, once manufactured, repositioning of mechanical buttons is virtually impossible. A touch screen, which may used both as an output device and an input device, also performs the function of a conventional button. Unfortunately, the display of a touch screen is partially obstructed whenever an operator uses it as an input device.

The above-described conventional buttons and touch screens require mechanical elements, which wear, degrade and fail with time. These conventional buttons and touch screens also require electronics at and wiring to the position of the buttons. Furthermore, these buttons and touch screens are not readily repositionable. Furthermore, the display of a touch screen may become smudged, smeared or scratched from an operator's use, thus further hindering an operator's ability to view an unobstructed display. Voice activation allows an operator an alternate these buttons, however, such voice control requires the use of a microphone and a relatively quiet environment. Therefore, a need exists to provide an operator of a handheld mobile device with the ability to enter a command into the mobile device without one or more of these drawbacks.

SUMMARY

Some embodiments of the present invention provide for a handheld mobile device to process user actions, the mobile device comprising: a housing comprising a first surface area; a first sensor comprises a first axis, wherein the first sensor is oriented to generate a signal indicative of angular movement of the mobile device about the first axis of the first sensor; a second sensor comprises a first axis, wherein the second sensor is oriented to generate a signal indicative of linear movement of the mobile device along the first axis of the second sensor; a processor coupled to receive data derived from the signal indicative of angular movement of the mobile device about the first axis of the first sensor and coupled to receive data derived from the signal indicative of linear movement of the mobile device along the first axis of the second sensor; a memory coupled to the processor, the memory for containing computer-executable instructions to determine an occurrence of a user action at the first surface area; and a display coupled to the processor updated based on the determination of the occurrence of the user action; wherein the first axis of the first sensor and the first axis of the second sensor are non-collinear to one another.

Some embodiments of the present invention provide for a handheld mobile device to process user actions, the mobile device comprising: a first sensing means for measuring motion and producing angular measurements indicative of angular movement about a first axis of a first sensor; a second sensing means for measuring motion and producing linear measurements indicative of linear movement along a first axis of a second sensor; a processing means for determining an occurrence of a user action at a first surface area on a housing of the mobile device based on the angular measurements and the linear measurements; and a display means for modifying a display based on the determined occurrence; wherein the first axis of the first sensor and the first axis of the second sensor are non-collinear to one another.

Some embodiments of the present invention provide for a method in a handheld mobile device of processing user actions, the method comprising: measuring motion and producing angular measurements indicative of angular movement about a first axis of a first sensor; measuring motion and producing linear measurements indicative of linear movement along a first axis of a second sensor; determining an occurrence of a user action at a first surface area on a housing of the mobile device based on the angular measurements and the linear measurements; and modifying a display based on the determined occurrence; wherein the first axis of the first sensor and the first axis of the second sensor are non-collinear to one another.

Some embodiments of the present invention provide for a computer-readable product comprising computer-readable medium comprising: code for causing at least one computer to initiate a first sensor to measure motion and provide angular measurements indicative of angular movement about a first axis of a first sensor; code for causing at least one computer to initiate a second sensor to measure motion and provide measurements indicative of linear movement along a first axis of a second sensor; code for causing at least one computer to determine an occurrence of a user action at a first surface area on a housing of the mobile device based on the angular measurements and the linear measurements; and code for causing at least one computer to modify a display based on the determined occurrence; wherein the first axis of the first sensor and the first axis of the second sensor are non-collinear to one another.

Some embodiments of the present invention provide for a method of selecting an object shown on a display of a handheld mobile device, the method comprising: measuring motion and producing angular measurements indicative of angular movement about a first axis of a first sensor; determining an occurrence of a user action based on the angular measurements, wherein the determined occurrence comprises a tilt of the mobile device; and modifying a display based on the determined occurrence.

These and other aspects, features and advantages of the invention will be apparent from reference to the embodiments described hereinafter.

BRIEF DESCRIPTION OF THE DRAWINGS

Embodiments of the invention will be described, by way of example only, with reference to the drawings.

DETAILED DESCRIPTION OF THE INVENTION

Figure 1A:
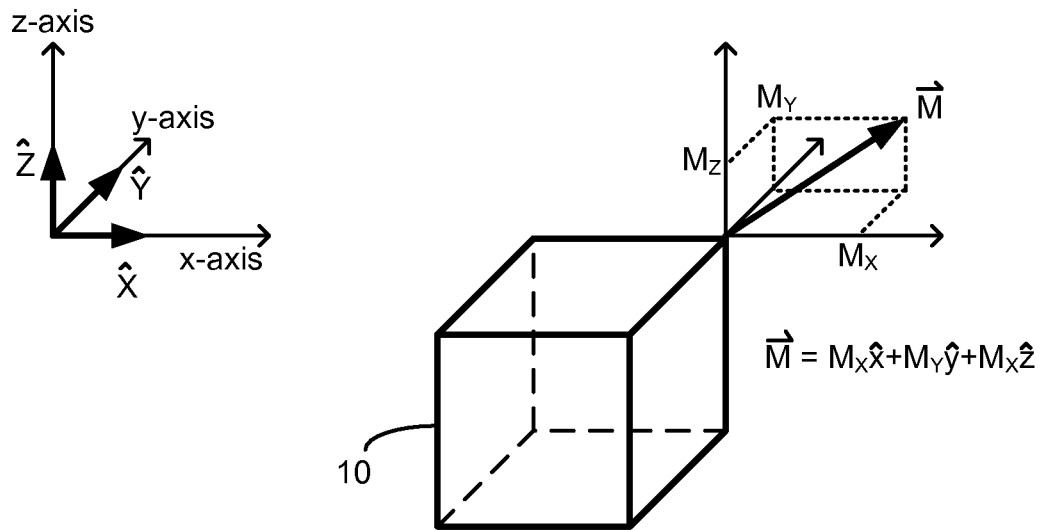
FIG. 1A shows a coordinate system for representing linear movement with respect to scalar values as measured by an accelerometer.

In the following description, reference is made to the accompanying drawings, which illustrate several embodiments of the present invention. It is understood that other embodiments may be utilized and mechanical, compositional, structural, electrical, and operational changes may be made without departing from the spirit and scope of the present disclosure. The following detailed description is not to be taken in a limiting sense. Furthermore, some portions of the detailed description that follows are presented in terms of procedures, steps, logic blocks, processing, and other symbolic representations of operations on data bits that can be performed in electronic circuitry or on computer memory. A procedure, computer executed step, logic block, process, etc., are conceived here to be a self-consistent sequence of steps or instructions leading to a desired result. The steps are those utilizing physical manipulations of physical quantities. These quantities can take the form of electrical, magnetic, or radio signals capable of being stored, transferred, combined, compared, and otherwise manipulated in electronic circuitry or in a computer system. These signals may be referred to at times as bits, values, elements, symbols, characters, terms, numbers, or the like. Each step may be performed by hardware, software, firmware, or combinations thereof. In a hardware implementation, for example, a processor/processing unit may be implemented within one or more application specific integrated circuits (ASICs), digital signal processors (DSPs), digital signal processing devices (DSPs), programmable logic devices (PLDs), field programmable gate arrays (FPGAs), processors, controllers, micro-controllers, microprocessors, electronic devices, other devices units designed to perform the functions described herein, and/or combinations thereof. Disclosed functionality can be implemented in control logic, where the term "control logic" refers to software implemented control logic (e.g., instructions configured to implement actions of the control logic), hardware (e.g., hardware including features such as logic gates to implement actions of the control logic), firmware (e.g., re-writeable features to implement actions of the control logic), or a combination.

Throughout this specification, reference may be made to "one example", "one feature", "an example" or "a feature" means that a particular feature, structure, or characteristic described in connection with the feature and/or example is included in at least one feature and/or example of claimed subject matter. Thus, the appearances of the phrase "in one example", "an example", "in one feature" or "a feature" in various places throughout this specification are not necessarily all referring to the same feature and/or example. Furthermore, the particular features, structures, or characteristics may be combined in one or more examples and/or features.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing circuit having a command set which includes the encoded commands. Such an instruction may be encoded in the form of a machine language understood by the processing circuit. Again, these are merely examples of an instruction and claimed subject matter is not limited in this respect.

"Storage medium" as referred to herein relates to media capable of maintaining expressions which are perceivable by one or more machines. For example, a storage medium may comprise one or more storage devices for storing machine-readable instructions and/or information. Such storage devices may comprise any one of several media types including, for example, magnetic, optical or semiconductor storage media. Such storage devices may also comprise any type of long term, short term, volatile or non-volatile memory devices. However, these are merely examples of a storage medium, and claimed subject matter is not limited in these respects.

Unless specifically stated otherwise, as apparent from the following discussion, it is appreciated that throughout this specification discussions utilizing terms such as "processing," "computing," "calculating," "selecting," "forming," "enabling," "inhibiting," "locating," "terminating," "identifying," "initiating," "detecting," "obtaining," "hosting," "maintaining," "representing," "estimating," "receiving," "transmitting," "determining" and/or the like refer to the actions and/or processes that may be performed by a computing platform, such as a computer or a similar electronic computing device, that manipulates and/or transforms data represented as physical electronic and/or magnetic quantities and/or other physical quantities within the computing platform's processors, memories, registers, and/or other information storage, transmission, reception and/or display devices. Such actions and/or processes may be executed by a computing platform under the control of machine-readable instructions stored in a storage medium, for example. Such machine-readable instructions may comprise, for example, software or firmware stored in a storage medium included as part of a computing platform (e.g., included as part of a processing circuit or external to such a processing circuit). Further, unless specifically stated otherwise, processes described herein, with reference to flow diagrams or otherwise, may also be executed and/or controlled, in whole or in part, by such a computing platform.

Wireless communication techniques described herein may be in connection with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may comprise an IEEE 802.11x network, and a WPAN may comprise a Bluetooth network, an IEEE 802.15x, for example. Wireless communication implementations described herein may also be used in connection with any combination of WWAN, WLAN and/or WPAN.

A device and/or system may estimate a device's location based, at least in part, on signals received from satellites. In particular, such a device and/or system may obtain "pseudo-range" measurements comprising approximations of distances between associated satellites and a navigation satellite receiver. In a particular example, such a pseudorange may be determined at a receiver that is capable of processing signals from one or more satellites as part of a Satellite Positioning System (SPS). Such an SPS may comprise, for example, a Global Positioning System (GPS), Galileo, Glonass, to name a few, or any SPS developed in the future. To determine its position, a satellite navigation receiver may obtain pseudorange measurements to three or more satellites as well as their positions at time of transmitting. Knowing the satellite's orbital parameters, these positions can be calculated for any point in time. A pseudorange measurement may then be determined based, at least in part, on the time a signal travels from an satellite to the receiver, multiplied by the speed of light. While techniques described herein may be provided as implementations of location determination in a GPS and/or Galileo types of SPS as specific illustrations, it should be understood that these techniques may also apply to other types of SPS, and that claimed subject matter is not limited in this respect.

Techniques described herein may be used with any one of several SPS, including the aforementioned SPS, for example. Furthermore, such techniques may be used with positioning determination systems that utilize pseudolites or a combination of satellites and pseudolites. Pseudolites may comprise ground-based transmitters that broadcast a PRN code or other ranging code (e.g., similar to a GPS or CDMA cellular signal) modulated on an L-band (or other frequency) carrier signal, which may be synchronized with GPS time. Such a transmitter may be assigned a unique PRN code so as to permit identification by a remote receiver. Pseudolites may be useful in situations where SPS signals from an orbiting satellite might be unavailable, such as in tunnels, mines, buildings, urban canyons or other enclosed areas. Another implementation of pseudolites is known as radio-beacons. The term "satellite", as used herein, is intended to include pseudolites, equivalents of pseudolites, and possibly others. The term "SPS signals", as used herein, is intended to include SPS-like signals from pseudolites or equivalents of pseudolites.

As used herein, a handheld mobile device or a mobile station (MS) refers to a device that may from time to time have a position or location that changes. The changes in position and/or location may comprise changes to direction, distance, orientation, etc., as a few examples. In particular examples, a mobile station may comprise a cellular telephone, wireless communication device, user equipment, laptop computer, other personal communication system (PCS) device, and/or other portable communication device. A mobile station may also comprise a processor and/or computing platform adapted to perform functions controlled by machine-readable instructions.

A handheld mobile device may include a single sensor or multiple sensors, which convert physical phenomena into analog and/or electrical signals. These sensors include, for example: (1) a barometric pressure sensor used to measure atmospheric pressure; (2) an altimeter used to determining altitude; (3) a biometric sensor used to measure heart rate or blood pressure; (4) a touch sensor used to detect touch or a fingerprint; (5) an accelerometer used to sense the direction of gravity and any other linear force experienced by the sensor; (6) a gyroscope used to measure the Coriolis effect, heading changes and rotation; and/or the like.

These sensors can enable different mobile applications depending on which sensors are integrated into a wireless device. It is important to note that some applications require more than one measurement from at least one sensor and may require multiple degrees (axes) of observability from a sensor. Furthermore, a sensor (or processor) may filter measurements before further processing, described below, occurs. It is also important to note that different applications may require different combinations of sensors wherein these sensors may play different roles.

In the case of navigation, both accelerometers and gyroscopes ("gyros") may be used to provide 6-axis of observability (x, y, z, $\tau$, $\phi$, $\psi$). The accelerometer can sense linear motion (i.e., translation in a plane, such as a horizontal plane); the translation can be measured with reference to at least two axes. Such an accelerometer also can offer a measure of an object's tilt (roll or pitch). Thus, with a single 3D accelerometer, an object's motion in Cartesian coordinate space (x, y, z) can be sensed, and the direction of gravity can be sensed to estimate the object's roll ($\tau$) and pitch ($\phi$). Since accelerometers cannot easily differentiate between the object's linear motion and tilt, a gyroscope may be used to measure the rotation about (x, y, z), that is, roll ($\tau$) and pitch ($\phi$) and yaw ($\psi$), sometime referred to as azimuth or heading.

For further information on multi-sensor devices, see U.S. Provisional Application 60/896,795, titled "Multi-Sensor Data Collection and/or Processing" with a filing date of Mar. 23, 2007, U.S. Provisional Application 60/909,380, titled "Multi-Sensor Data Collection and/or Processing" with a filing date of Mar. 30, 2007, U.S. Provisional Application 60/914,716, titled "Multi-Sensor Data Collection and/or Processing" with a filing date of Apr. 27, 2007, and U.S. patent application Ser. No. 12/054,303, titled "Multi-Sensor Data Collection and/or Processing" by inventor L. Sheynblat and T. Wolf and filed Mar. 24, 2008, the contents each of which are included herein by reference. These sensors, as well as other possible sensors not listed, may be used individually or may be used in combination, depending on a particular application.

In movement detection applications, accelerometers and/or gyroscopes may be integrated into a handheld mobile device to provide adequate degrees of observability. FIG. 1A shows a coordinate system (x, y, z) for representing linear movement with respect to scalar values, a series of scalar values, or time varying functions ($M_X$, $M_Y$, $M_Z$) as measured by an accelerometer 10. Some accelerometers 10 may provide a magnitude while others may simply provide an indication of movement without a magnitude. An accelerometer 10 measures linear movement (vector M) along a line with reference to one, two or three linear directions, often referenced with Cartesian coordinates (x, y, z). For example, a one-dimensional accelerometer 10 may provide measurements to indicate linear movement along the x-axis. A two-dimensional accelerometer 10 may provide measurements to indicate linear movement in a plane along both the x-axis and y-axis and a three-dimensional accelerometer 10 may provide measurements to indicate linear movement in 3-dimensional space along the x, y and z-axes. A three-dimensional accelerometer 10 may comprise a two-dimensional accelerometer combined with a one-dimensional accelerometer or may comprise three one-dimensional accelerometers. An accelerometer 10 may provide measurements in terms of linear acceleration (in units representing distance per units of time squared; e.g., [m/sec$^2$]), linear velocity (in units representing distance per units of time; e.g., [m/sec]), or linear distance (in units representing distance; e.g., [m]). Linear motion (vector M) may be represented by three values in vector form $M=M_X X+M_Y Y+M_Z Z$, where ($M_X$, $M_Y$, $M_Z$) are magnitudes, scalar values, a series of scalar values, or time varying functions, and (X, Y, Z) are unit vectors with respect to the origin of a Cartesian coordinate system (x, y, z). In general, an accelerometer as described herein is a sensing means for detecting motion and generating information indicative of linear movement along the one, two or three axes of the accelerometer.

Figure 1B:
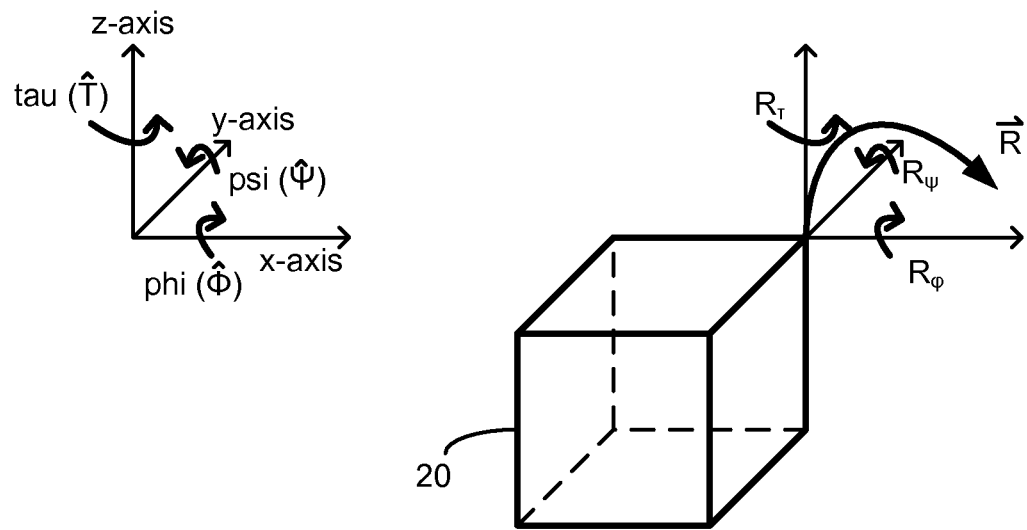
FIG. 1B shows a coordinate system for representing rotational movement with respect to scalar values as measured by a gyroscope.

FIG. 1B shows a coordinate system ($\tau$, $\phi$, $\psi$) for representing rotational movement with respect to scalar values, a series of scalar values, or time varying functions ($R_\tau$, $R_\phi$, $R_\psi$) as measured by a gyroscope 20. A gyroscope 20 measures rotational movement (vector R) about one, two or three axes. Conventionally, gyroscopic rotation is measured in terms of coordinates ($\tau$, $\phi$, $\psi$), where tau ($\tau$) represents yaw or rotation about the z-axis, phi ($\phi$) represents roll or rotation about the x-axis, and psi ($\psi$) represents pitch or rotation about the y-axis. A one-dimensional gyroscope 20 may provide measurements to indicate rotational movement about a first axis. A two-dimensional gyroscope 20 may provide measurements to indicate rotational movement about a first axis and a second axis. A three-dimensional gyroscope 20 may provide measurements to indicate rotational movement about first, second and third axes. A three-dimensional gyroscope 20 may comprise a two-dimensional gyroscope combined with a one-dimensional gyroscope or may comprise three one-dimensional gyroscopes. A gyroscope 20 may provide measurements in terms of angular acceleration (in units representing change in an angle per unit of time squares; e.g., [rad/sec$^2$]), angular velocity (in units representing change in an angle per unit of time; e.g., [rad/sec]), or an angle (in units representing an angle; e.g., [rad]). Rotational motion (vector R) may be represented by three scalar values, a series of scalar values, or time varying functions in vector from, where $R=R_\tau \tau+R_\phi \phi+R_\psi \psi$, where ($R_\tau$, $R_\phi$, $R_\psi$) are scalar values, a series of scalar values, or time varying functions, and where ($\tau$, $\phi$, $\psi$) are unit vectors in with respect to the rotational coordinate system ($\tau$, $\phi$, $\psi$). For more information on gyroscopes, see U.S. Pat. No. 6,892,575, titled "X-Y Axis Dual-Mass Tuning Fork Gyroscope with Vertically Integrated Electronics and Wafer-Scale Hermetic Packaging" by first named inventor Steven Nasiri issued May 17, 2005. In general, a gyroscope, as described herein, is a sensing means for detecting motion and producing information indicative of angular movement about one, two or three axes of the gyroscope.

A single accelerometer 10 may be used to sense linear movement while a single gyroscope 20 may be used to measure angular movement such as a tilt or roll. Integrating two separate accelerometers 10, two separate gyroscopes 20 or the combination of an accelerometer 10 and a gyroscope 20 into a handheld mobile device may be used to sense linear movement as well as angular movement. As described below, virtual buttons may be implemented in structures with the ability to sense the combination of linear and angular movement.

In one example, a three-dimensional accelerometer 10 and a three-dimensional gyroscope 20 provide six axes of observability (x, y, x, $\tau$, $\phi$, $\psi$). Two three-dimensional accelerometers 10 may also provide six axes of observability ($x_1$, $y_1$, $x_1$, $x_2$, $y_2$, $x_2$). A reduced dimensional sensor may be used to sense fewer axes of linear and/or rotational motion. For example, a two-dimensional accelerometer 10 and a two-dimensional gyroscope 20 may provide four axes of observability (x, y, $\tau$, $\phi$). Techniques described herein may implement a single-sensor or a multi-sensor handheld mobile device measuring one or more dimensions as described in detail below.

Figure 2:
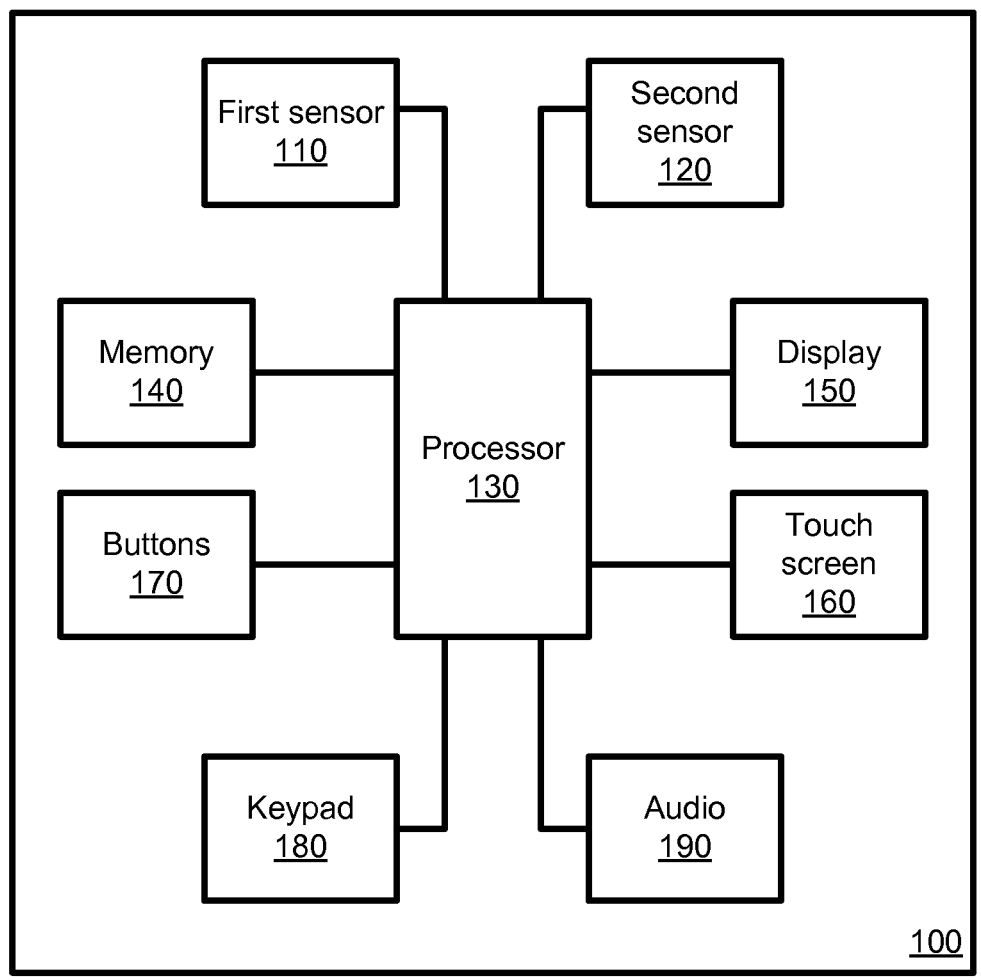
FIG. 2 is a block diagram of handheld mobile device.

FIG. 2 is a block diagram of handheld mobile device 100. The mobile device 100 houses a first sensor 110, a second sensor 120, a processor 130, memory 140 and a display 150. The mobile device 100 may also include a circuitry to accept operator input and provide output data including a touch screen 160 integrated with the display 150, one or more buttons 170, one or more keypads 180 and/or an audio device 190 (such as a speaker and/or a microphone). First sensor 110 and second sensor 120 may be mounted on one or more boards. Depending on the system confirmation (e.g., the types of sensors used), first sensor 110 and second sensor 120 may be mounted on the same board, or may be mounted on different boards. The different boards may be oriented substantially perpendicular to one another.

Figure 3A:
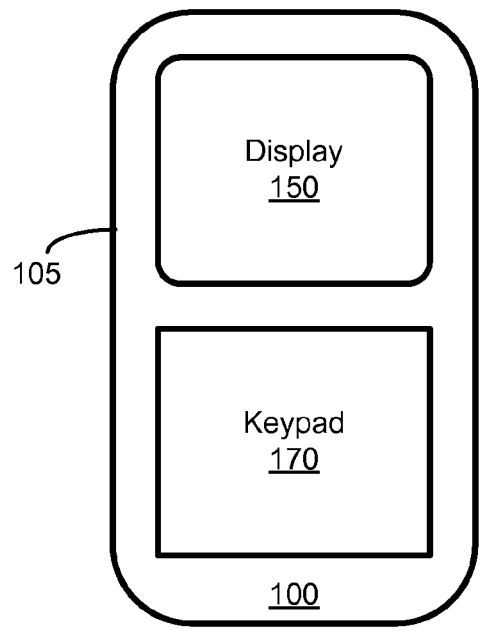
FIGS. 3A, 3B, 3C and 3D show various views of a first handheld mobile device.
Figure 3B:
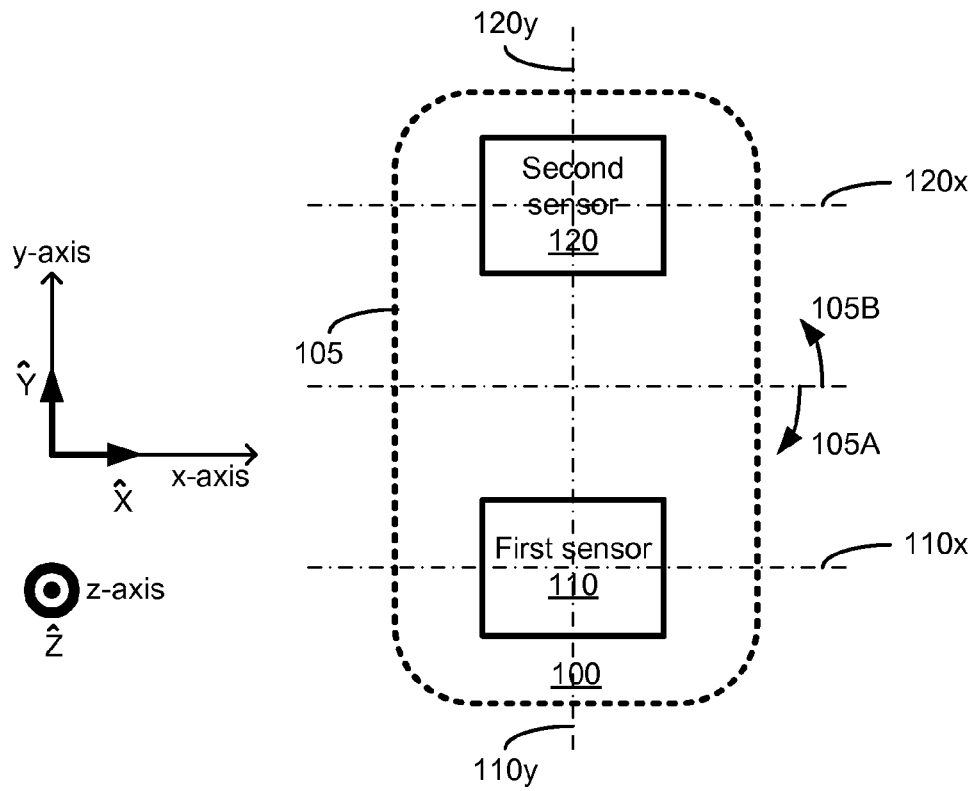

FIGS. 3A though 3D show alternate views of a handheld mobile device 100. In FIG. 3A, an exterior view of a mobile device 100 is shown to include a housing 105, a display 150 and a keypad 160. In FIG. 3B, an interior view of the housing 105 of a mobile device 100 encloses and supports a first sensor 110 and a second sensor 120. Also enclosed in the housing 105 (but not shown in FIG. 3B) is a processor 130 and memory 140 of FIG. 2. The housing 105 may be viewed as having two portions or sections: a first portion 105A around the first sensor 110 and a second portion 105B around the second sensor 120. In this example showing a vertical displacement, the mobile device 100 is divided into the two portions by an x-z plane roughly splitting the mobile device 100 in equal halves.

Figure 3C:
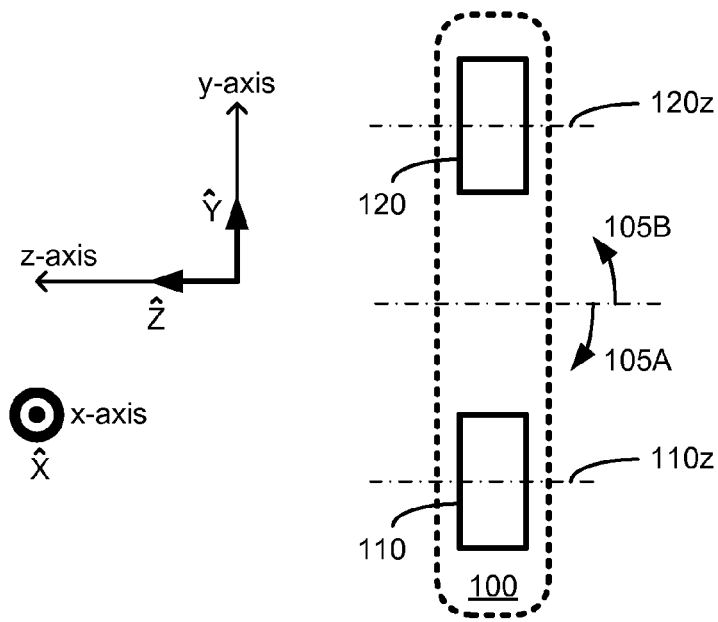

FIG. 3C shows a side-end view of the handheld mobile device 100. The first sensor 110 is positioned in the first portion 105A of the mobile device 100 and the second sensor 120 is positioned in a second portion 105B of the mobile device 100, with the first portion vertically displaced from the second portion 105B.

The first sensor 110 may be either a gyroscope or an accelerometer, which defines one or more axes (e.g., an x-axis 110x, a y-axis 110y and a z-axis 110z) respectively corresponding to one, two or three dimensions of the first sensor 110. For example, the first sensor 110 may be a one-dimensional gyroscope positioned within the housing 105 to measure angular movement of the mobile device 100 about a first axis of the first sensor 110. This first axis may be the x-axis 110x, y-axis 110y, z-axis 110z, or a similar axis. For example, if the first axis is the z-axis 110z, the first sensor 110 would be oriented to generate a signal indicative of angular movement of the mobile device 100 about the z-axis 110z of the first sensor 110.

As another example, the first sensor 110 may be a three-dimensional gyroscope oriented within the housing 105 to measure angular movement of the mobile device 100 about the x-axis 110x, y-axis 110y and z-axis 110z (or a similar set of three axes). In this example, the first sensor 110 would be oriented to generate a signal indicative of angular movement of the mobile device 100 about the x-axis 110x, y-axis 110y and z-axis 110z of the first sensor 110.

Similarly, the second sensor 120 may also be a gyroscope or an accelerometer, which defines one or more axes (e.g., an x-axis 120x, a y-axis 120y and a z-axis 120z) respectively corresponding to one, two or three dimensions of the second sensor 120. For example, the second sensor 120 may be a one-dimensional accelerometer oriented within the housing 105 to measure linear movement of the mobile device 100 along a first axis of the second sensor 120. This first axis may be the x-axis 120x, y-axis 120y, z-axis 120z, or a similar axis. For example, if the first axis is the x-axis 120x, the second sensor 120 would be oriented to generate a signal indicative of linear movement of the mobile device 100 along the x-axis 120x of the second sensor 120.

Figure 3D:
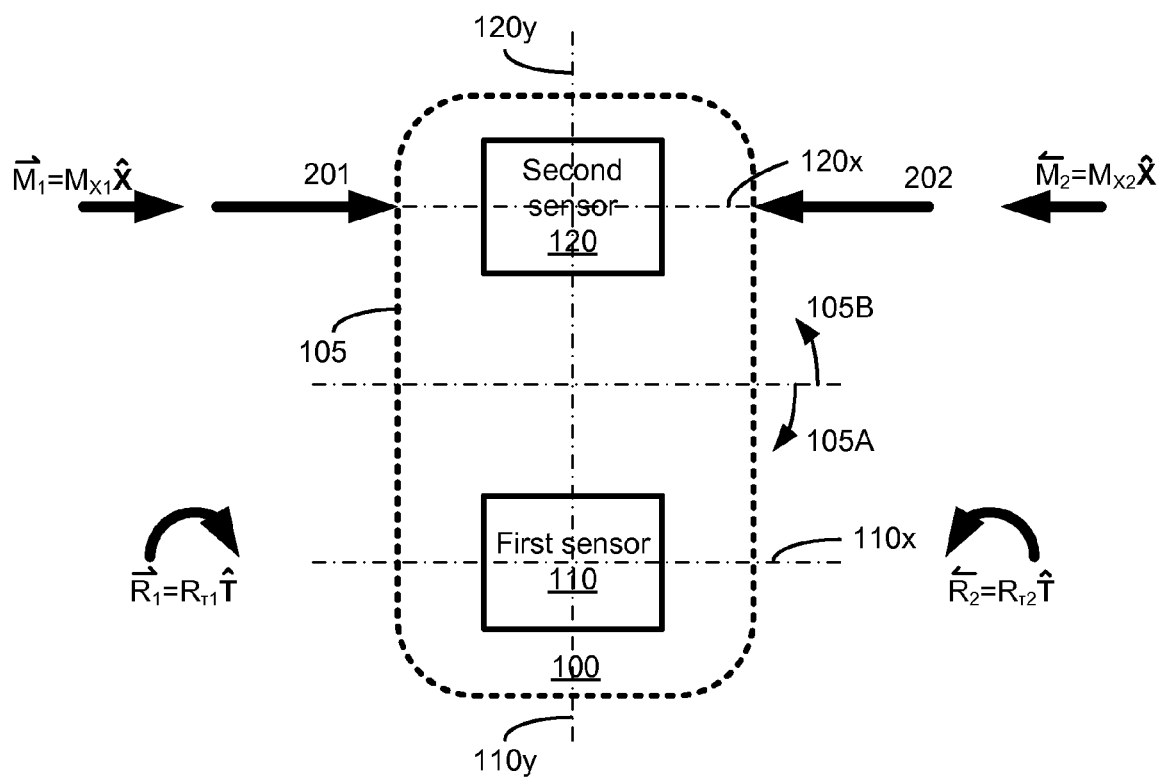

FIG. 3D shows a user action or force 201 at a first surface area, which is shown at the left side of the top portion 105B of the housing 105. Depending on the sensitivity of the sensors and the processing power of the processor, the first surface area may be the area of a finger tip (approx. 0.1 to 1 cm$^2$) or larger (e.g., 1 cm$^2$ to 10 cm$^2$). The user action may be a tap, series of taps, a finger slide or similar action expressed by an operator against the housing 105 resulting in force 201. Alternatively, the first surface area may be the entire housing 105 and the force 201 may be caused by a turning, flipping, rocking, knocking, shaking or tilting of the mobile device 100. The force 201 may considered time varying or as a constant over a short duration of time. The example force 201 is shown applied in line with the x-axis 120x of the second sensor 120. In a particular embodiment, the first surface area is less than the surface area of the housing, and is referred to as a "virtual button." In response to user action against the first surface area, one or more of first sensor 110 and second sensor 120 generates a signal indicative of the motion of mobile device 100. The signal is processed and information indicative of user activation of the virtual button is output. For example, the first sensor 110, second sensor 120, and/or additional sensors generate signals indicative of a user tap, series of taps, etc. in the first surface area. The sensor signals may then be processed using, e.g., analog to digital conversion and data processing, to determine that the user action against the first surface was indicative of selection of the virtual button. By contrast, motion different than user selection of the virtual button (e.g., different user action against the first surface are, unintended force against the first surface area or a different surface area, or other action) may also cause first sensor 110, second sensor 120, and/or other sensors in device 100 to generate signals. However, processing the signals generated as a result of this different motion causes the system to determine that the motion was not indicative of selection of the virtual button.

As an example, assume the first sensor 110 is a gyroscope and the second sensor 120 is an accelerometer. The first sensor 110 is oriented in the housing 105 to detect and measure angular movement of the mobile device 100 about a first axis (e.g., z-axis 110z) of the first sensor 110. The first sensor 110 generates a signal indicative of this angular movement. The second sensor 120 (an accelerometer) is oriented to measure linear movement along a first axis of the second sensor 120 (e.g., x-axis 120x). In this orientation, the first axis (z-axis 110z) of the first sensor 110 and the first axis (x-axis 120x) of the second sensor 120 are non-collinear to one another and are theoretically, but not necessarily, orthogonal to one another. Although the current disclosure uses x, y, and z axes for the purposes of illustration, the claims are not limited to orthogonal axes (although substantially orthogonal axes are generally the most efficient).

For any embodiment, a processor 130 may detect and measure the occurrence of force 201 by processing the signals indicative of such angular and linear movement. The processor 130, coupled to memory 140 or other storage medium containing computer-executable instructions, determines the occurrence of this user action at the first surface area. Once the processor 130 determines the occurrence of the user action, further processing occurs responsive to the user action thereby indicated to the operator that the user action was recognized. As a result, the processor 130 may activate a sound through an audio device 180, update what is shown on a display 150, start recording sound, toggle a vibrate mode on & off, scroll or pan an image on the display, select an icon or displayed image, enter a sleep mode, wake up from a sleep mode, mute audio, answer an incoming call, initiate an outgoing call or message, enter a mode of operation, or other function. User-related output or input may be associated with any sensory experience of a user. Each of the processing units listed above are examples of a processors 130 that may provide a processing means for determining an occurrence of a user action at a first surface area on a housing 105 of the mobile device 100 based on angular measurements and/or linear measurements from sensors. Similarly, displays, such as touch screens, LCDs, LEDs and the like, may provide a display means for modifying a display based on a determined occurrence.

For example, when force 201 is initially applied, the first sensor 110 will initially detect and measure a first rotation ($R_1=R_{\tau 1}\tau$) about the z-axis 110z and the second sensor 120 will initial detect and measure a first linear motion ($M_1=M_{X1}X$) along x-axis 120x. The processor 130 receives and processes the measurements ($R_1$, $M_1$) from the first and second sensors 110, 120 to determine that a force 201 was initiated by an operator. Therefore, an operator may supply a command to the processor 130 without using physical buttons but rather by using a virtual button located at the first surface area.

Another user action, shown as a second force 202, is applied to a second surface area, which is shown at the left side the top portion 105B of the housing 105. For simplicity, assume the second user action (resulting in force 202) is equal and opposite from the first user action (force 201). When force 202 is initially applied, the first sensor 110 will measure a second rotation ($R_2=-R_1=-R_{\tau 1}\tau=R_{\tau 2}\tau$) about z-axis 110z and the second sensor 120 will measure a second linear motion ($M_2=-M_1=-M_{X1}X=M_{X2}X$) along x-axis 120x. Again, the processor 130 receives and processes the measurements ($R_2$, $M_2$) from the first and second sensors 110, 120 to determine that a force 202 was initiated by an operator executing the user action. Thus, sensors 110 and 120 may be oriented in the housing 105 and used to detect use of virtual buttons located at the first and/or second surface areas.

Figure 4A:
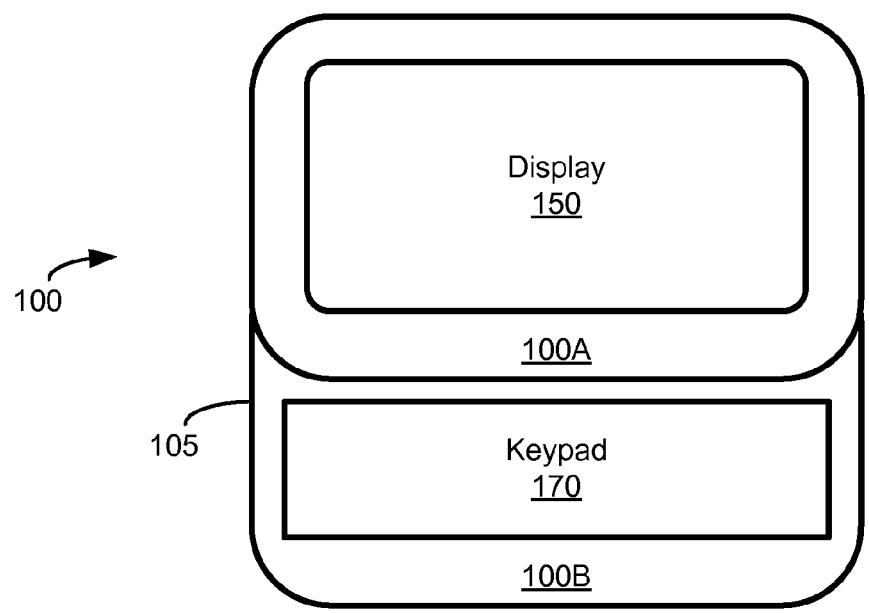
FIGS. 4A, 4B, 4C, 4D, 4E and 4F show various views of a second handheld mobile device.
Figure 4B:
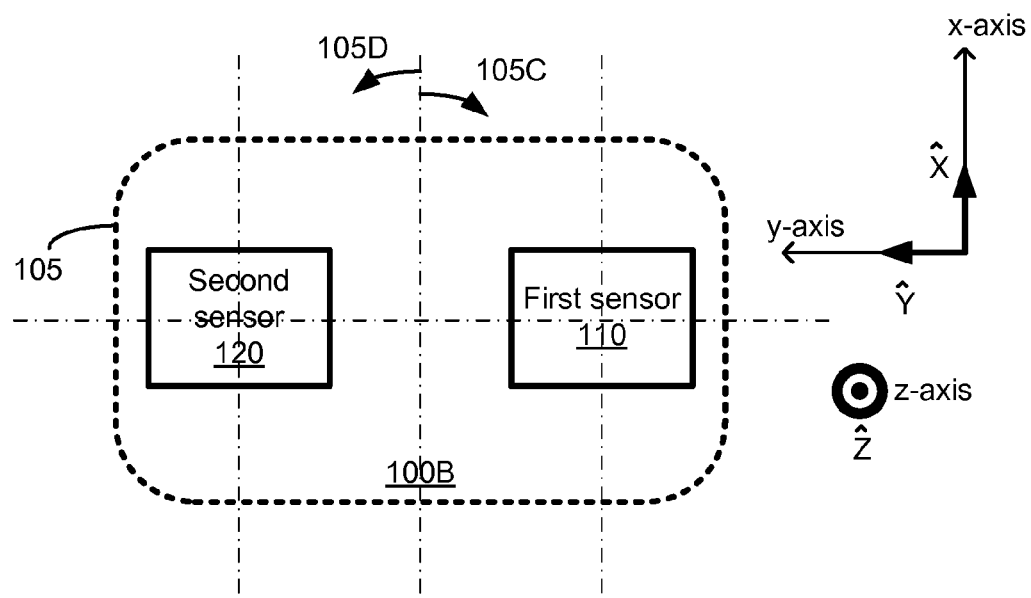

FIGS. 4A, 4B, 4C, 4D, 4E and 4F show various views of a second handheld mobile device 100 with a full display 150. In FIG. 4A, the housing 105 includes a top half 100A and a bottom half 100B, which slide apart and expose a keypad 170. A pair of sensors (first sensor 110 and second sensor 120) may reside together or separately in the top half 100A and/or the bottom half 100B of the housing 105. FIG. 4B shows an interior view of the top half 100A of the housing 105, which includes the first sensor 110 and the second sensor 120 together. The first sensor 110 is positioned in a first portion 105C of the mobile device 100 and the second sensor 120 is positioned in a second portion 105D of the mobile device 100. (Alternatively, one sensor could be positioned to one side of the top half 100A and another sensor could be positioned to the other side of the bottom half 100B, thereby maximizing a distance between the sensors when the halves 100A, 100B expose the keypad 170.) Unlike the mobile device 100 of FIGS. 3A-3D where the first and second portions 105A, 105B where vertically displaced, here in FIG. 4B the first portion 105C is laterally displaced from the second portion 105D. In this example showing a lateral displacement, the mobile device 100 is divided into the two portions by an x-z plane roughly splitting the mobile device 100 in equal halves.

Figure 4C:
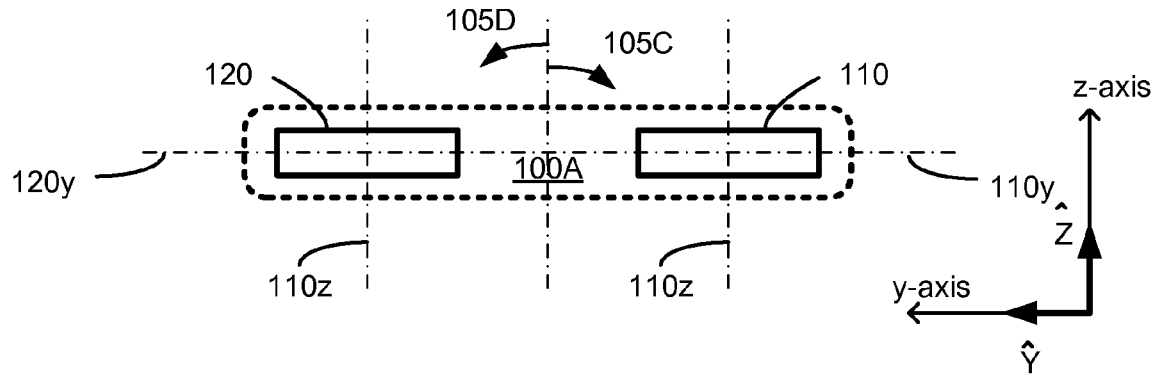

FIG. 4C shows a top-end view of the handheld top half 100A of the mobile device 100. The first sensor 110 is positioned in the first portion 105C of the mobile device 100 and the second sensor 120 is positioned in a second portion 105D of the mobile device 100, with the first portion laterally displaced from the second portion 105D.

Again, each sensor 110, 120 may be either a gyroscope or an accelerometer, which defines one or more axes (e.g., an x-axis 110x, a y-axis 110y and a z-axis 110z) respectively corresponding to one, two or three dimensions of the first sensor 110. For example, the first sensor 110 may be a three-dimensional gyroscope oriented within the housing 105 to measure angular movement of the mobile device 100 about the x-axis 110x, y-axis 110y and z-axis 110z and the second sensor 120 may be a three-dimensional accelerometer oriented within the housing 105 to measure linear movement of the mobile device 100 along the x-axis 120x, y-axis 120y, z-axis 120z.

Figure 4D:
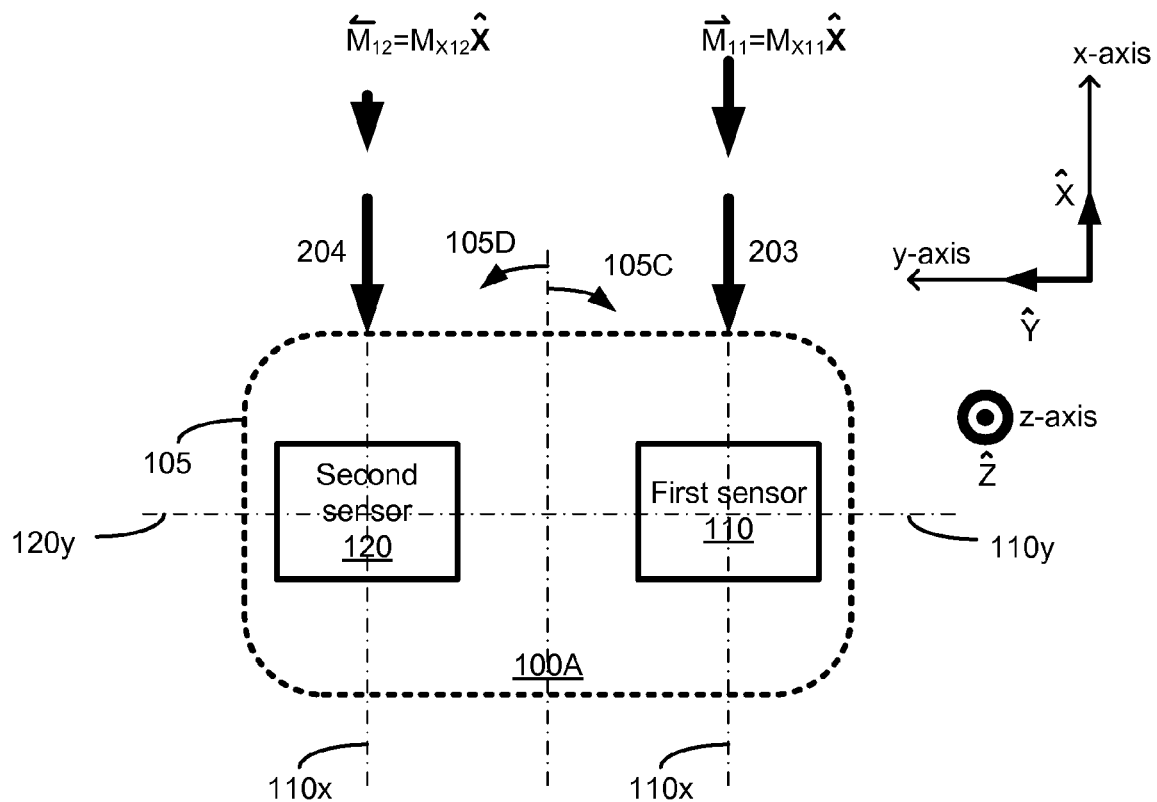

FIG. 4D shows a user action or force 203 at a first surface area corresponding to a virtual button, which is shown at the top-right side of the right portion 105C of the housing 105. This first force 203 is shown applied along the x-axis 110x of the first sensor 110. A second force 204 is shown applied at a second surface area, which is along the x-axis 120x of the second sensor 120.

As an example, assume the first sensor 110 and second sensor 120 are both accelerometers, where the first sensor 110 measures linear movement along its x-axis 110x and the second sensor 120 measures linear movement along its x-axis 120x. The first force 203 at the first surface area will result in substantial movement ($M_{11}=M_{X11}X$) along 110x and little to no movement ($M_{12}=M_{X12}X$) along 120x as shown in FIG. 4D. Similarly, the second force 204 at the second surface area will result in substantial movement ($M_{22}=M_{X22}X$) along 120x and little to no movement ($M_{21}=M_{X21}X$) along 110x.

Figure 4E:
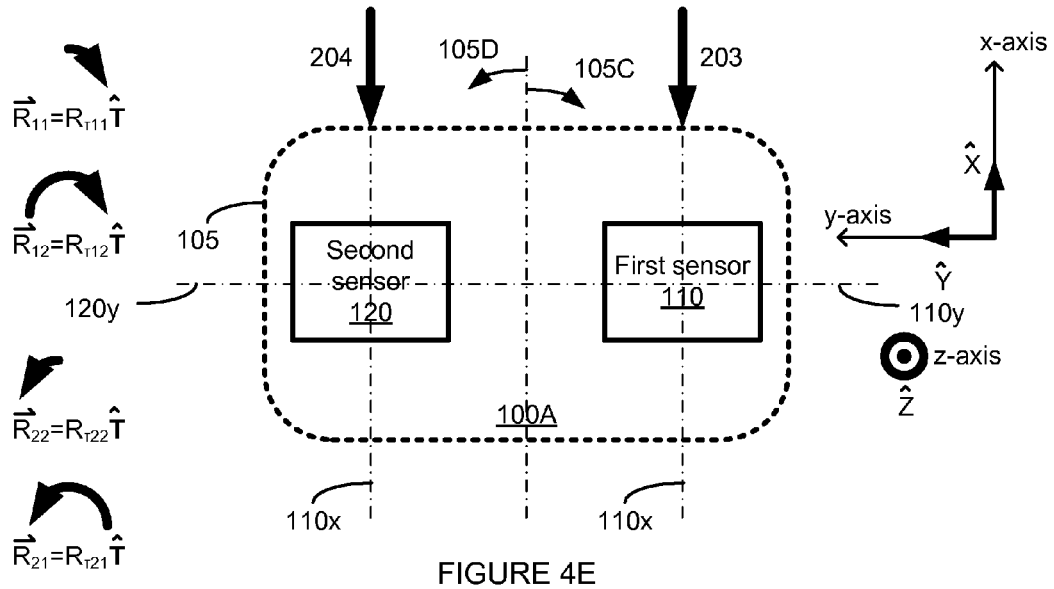

FIG. 4E shows another example, which assumes the first sensor 110 and second sensor 120 are both gyroscopes with the first sensor 110 measuring angular rotation about its z-axis 110z and the second sensor 120 measuring angular rotation about its z-axis 120z. The first force 203 at the first surface area will result in little to no rotation ($R_{11}=R_{\tau 11}\tau$) about 110z and more substantial rotation ($R_{12}=R_{\tau 12}\tau$) about 120z. Assuming the forces 203 and 204 are equivalent in magnitude, the second force 204 at the second surface area will result in little to no rotation ($R_{22}=R_{\tau 22}\tau=-R_{\tau 11}\tau$) about 120z and more substantial rotation ($R_{21}=R_{\tau 21}\tau=-R_{\tau 12}\tau$) about 110z.

Figure 4F:
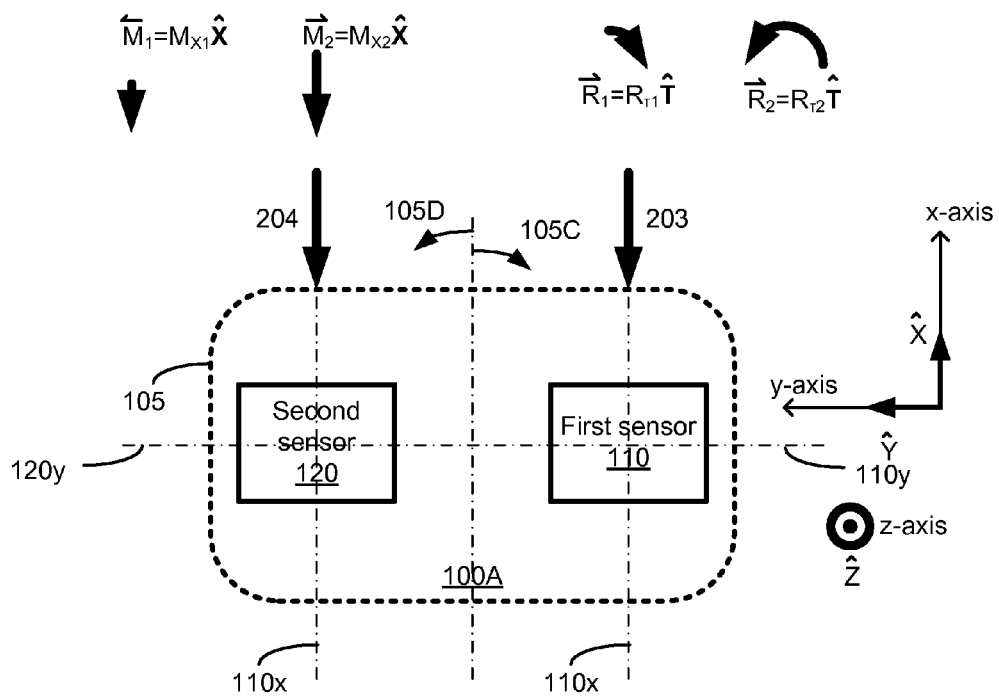
Figure 5A:
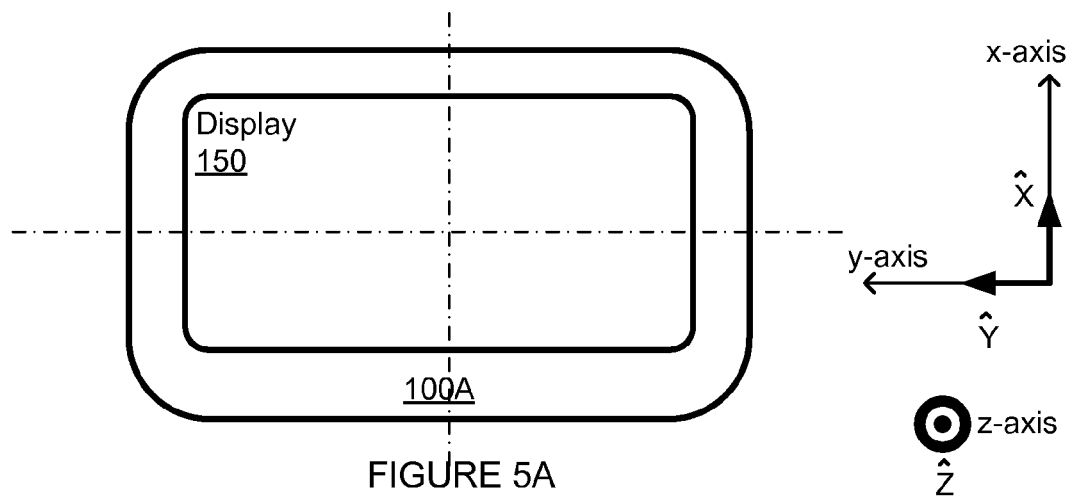
FIGS. 5A, 5B and 5C show various views of a third handheld mobile device.
Figure 5B:
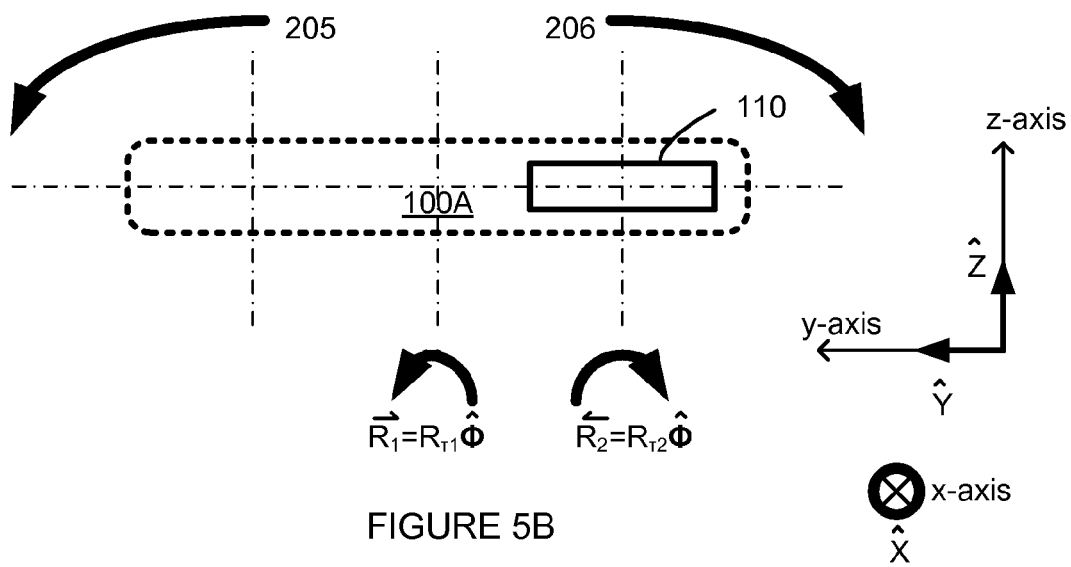
Figure 5C:
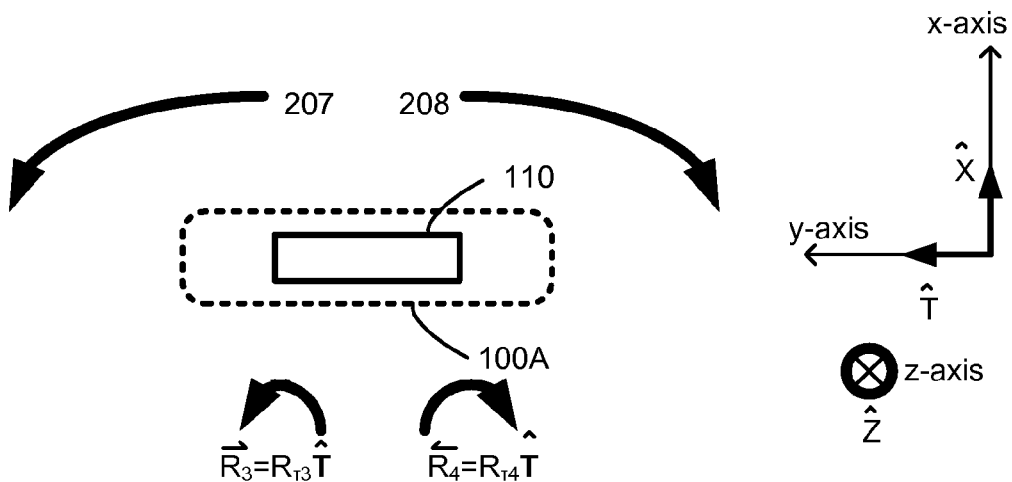

FIG. 4F shows yet another example, which assumes the first sensor 110 is a gyroscope measuring angular rotation about its z-axis 110z and the second sensor 120 is an accelerometer measuring linear movement along its x-axis 120x. The first force 203 at the first surface area will result in little to no rotation ($R_1=R_{\tau 1}\tau$) about 110z measured by the first sensor 110 and little linear movement ($M_1=M_{\tau 1}X$) along 120x measured by the second sensor 120. The second force 204 at the second surface area will result in more substantial rotation ($R_2=R_{\tau 2}\tau$) measured by the first sensor 110 about 110z and more substantial linear movement ($M_2=M_{X2}X$) measured by the second sensor 120 along 120x.

A processor 130 receives and processes these measurement singles ($M_{11}$, $M_{12}$, $M_{21}$, $M_{22}$; $R_{11}$, $R_{12}$, $R_{21}$, $R_{22}$; or $M_1$, $R_1$, $M_2$, $R_2$) to determine the occurence of forces 203 and/or 204 and thus may interpret a detected user action as an operator input command. As such, an operator may supply a command to the processor 130 using a first virtual button located at the first surface area and/or a second virtual button located at the first surface area.

Several of the examples above included two one-dimensional sensors (i.e., a single-axis gyroscope and a single-axis accelerometer, two single-axis gyroscopes or two single-axis accelerometers). Other configurations are also possible such as a mobile device 100 including a single one-dimensional sensor, a pair of one, two or three-dimensional sensors, or four three-dimensional sensors. Sensors having additional dimensions may assist the processor 130 in distinguishing a user action at a virtual button from other actions. For example, a sensor measuring a large linear or angular change in one dimension as compared to the other one or two dimensions will reassure that an operator initiated a particular user action. For example, a tap will result along or about one axis will result in sense data that shows little to no movement in the other two dimensions. Dropping the mobile device, however, may appear as a tap when only considering a single dimension of a sensor but the processor 130 will detect simultaneous forces along or about multiple axes.

As another example, a mobile device 100 may have a first sensor 110 that is a two-dimensional gyroscope generating a signal indicative of angular movement of the mobile device 100 with reference to two non-collinear axes. The mobile device 100 may further include a second sensor 120, such as any of those described above, which is positioned relative to the first sensor 110 to define one or more surface areas for a corresponding one or more virtual buttons. The two non-collinear axes of the first sensor 110 and a reference axis of the second sensor 120 are optimally, but not necessarily, orthogonal to one another.

Yet with another example, a mobile device 100 may have a first sensor 110 that is a three-dimensional gyroscope generating a signal indicative of angular movement of the mobile device 100 with reference to three different (non-collinear axes), such as substantially orthogonal axes. The mobile device 100 may further include a second sensor 120, such as any of those described above positioned relative to the first sensor 110 thereby defining one or more surface areas for a corresponding one or more virtual buttons.

In a further example, a mobile device 100 may have a first sensor 110 and a second sensor 120, where the second sensor 120 includes a two or three-dimensional accelerometer generating a signal indicative of linear motion of the mobile device 100 with reference to a corresponding two or three axes. The first sensor 110 may be any of those sensors described above and positioned relative to the second sensor 120 to define one or more surface areas for a corresponding one or more virtual buttons.

A mobile device 100 with four three-dimensional sensors may be configured such that a three-dimensional accelerometer and a three-dimensional are paired and co-located where FIG. 4F shows the first sensor 110. A second three-dimensional accelerometer and three-dimensional are paired and co-located where FIG. 4F shows the second sensor 120. With this combination, virtual buttons should be detectable wherever located on the surface of the housing 105.

Strategic positioning of the one or more sensors within a mobile device 100 helps to define one or more surface areas available as virtual buttons. Accelerometers, if any, are optimally positioned within the housing 105 such that a surface area defining a virtual button is in line with an active axis of the accelerometer. Such positioning provides for maximum measurements from the accelerometer. Similarly, gyroscopes, if any, should be positioned within the mobile device 100 perpendicular to the direction of force and distant from the surface area(s) defining the virtual button(s). That is, the gyroscopes should be oriented within the mobile device 100 such that a measuring axis is perpendicular to the expected rotation of the mobile device 100 resulting from use of the virtual buttons. This positioning and orienting of the accelerometer maximizes the lever arm between the virtual button and the surface area thereby maximizing the sensitivity of the mobile device 100 in detecting operator commands in the form of user actions. In some embodiments, a minimum sensitivity is needed to determine whether motion of the mobile device indicates user selection of a virtual button, and a lever arm between a first sensor and a second sensor is equal to or greater than a minimum lever arm associated with the minimum sensitivity. When more than one virtual button is desired, optimal sensor positioning and orientation should be balanced with the number, size and positioning of the virtual buttons.

In general, a pair of sensors should be positioned in opposite halves of a device. For example in a two-sensor mobile device 100, a first sensor 110 is positioned in a first portion of the mobile device 100 and the second sensor 120 is positioned in a second portion of the mobile device 100, where the first and second portions provide a substantial distance between two sensors 110, 120. Depending on the orientation of the mobile device 100, these portions are often either vertically or horizontally displaced from one another as described above.

Figure 6A:
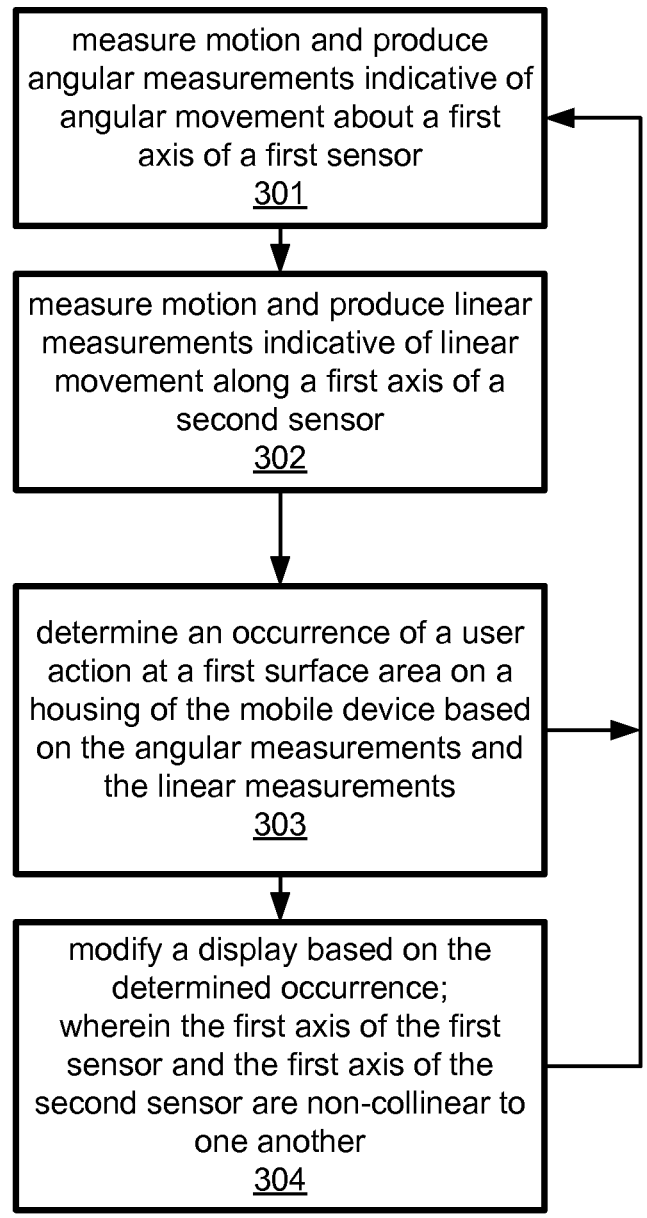
FIGS. 6A and 6B show flowcharts for processing signals within a mobile device.
Figure 6B:
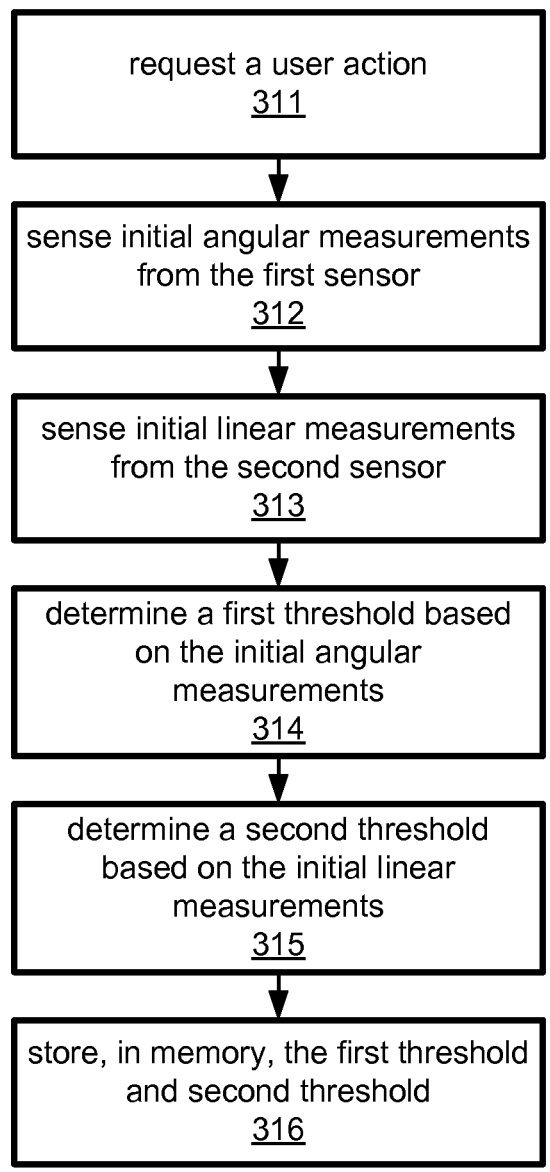

FIGS. 6A and 6B show flowcharts for processing signals within a mobile device 100 having one gyroscope (first sensor 110) and one accelerometer (second sensor 120). In FIG. 6A, regular processing begins at 301 with a first sensor 110 generating a signal indicative of angular movement about a first axis of a first sensor 110, in response to user selection of a virtual button (e.g., tapping the portion of the surface area designated as the "button"). To improve the detection of angular motion associated with user selection of the virtual button, the first sensor 110 can be positioned at a substantial distance from the surface area corresponding to the virtual button. Also, the first sensor 110 is oriented within the housing 105 such that an operator's activation of a first virtual button occurs along a non-collinear axis, such as a substantially orthogonal or fully orthogonal axis. The processor 130 may initially program the first sensor 110 to cause the first sensor 110 to measure motion and provide angular measurements indicative of angular movement about a first axis of a first sensor 110.

At 302, the process continues with a second sensor 120 generating a signal indicative of linear movement along a first axis of a second sensor 120, in response to user selection of the virtual button. The second sensor 120 is positioned in line with the operator's action of the first virtual button. The processing at 301 and 302 may occur in any order and/or in parallel. Again, the processor 130 may initially program the second sensor 120 to cause second sensor 120 to measure motion and provide measurements indicative of linear movement along a first axis of a second sensor 120.

At 303, the process continues with a processor 130 receiving the angular measurements and the linear measurements and determining, based on these measurements, whether or not an operator has initiated an action at the virtual button. For example, the processor 130 may compare a measurement associated with a first dimension from a first sensor 110 to a threshold to determine if a sufficient force is present to indicate a user action. Alternatively, the processor 130 may determine a measurement associated with a first dimension from a first sensor 110 is greater than a first threshold, and that measurement associated with other dimensions from a first sensor 110 are less than a threshold. Additionally, the processor 130 may perform an equivalent analysis on measurements from the second sensor 120 thereby isolating the direction and intensity of the force. The direction and intensity of the force may be associated with at surface area of the mobile device 100. Therefore, if the processor 130 determines a surface area received a particular user action, the user action may be accepted as an input. If no user action is detected, the process may return to 301 and 302 to collected more measurement data. If the processor detects an occurrence of a user action at a first surface area on a housing 105 of the mobile device 100, processing continues to 304, where the processor 130 may modify a display 150 or take some other action based on the determined occurrence.

FIG. 6B shows a process of calibration, which may occur before, during or after the processing shown in FIG. 6A. In FIG. 6B, the processor 130 calibrates the first and/or second sensors 110, 120. At 311, the processor 130 requests an occurrence of a user action. For example, the display 150 shows a message requesting the operator to tap a virtual button. At 312, the first sensor 110 senses and makes initial angular measurements during the moment when the operator taps the virtual button. Similarly, at 313, the second sensor 120 senses and makes initial linear measurements.

At 314 and 315, the processor 130 determines one or more thresholds to be used in determination of user selection of virtual button(s). For example, processor 130 determines a first threshold based on the initial angular measurements or a second threshold based on the initial linear measurements for each dimension of each sensor. At 316, the processor 130 stores, in memory, these thresholds for use by subsequent processing when determining the occurrence of a user action (step 303 described above). These user actions include, for example, a single tap, a plurality of taps, a stroke, or the like along the first surface area on the housing 105 of the mobile device 100. Other factors may be used to determine one or more thresholds; for example, a temperature sensor may be integrated with or proximate to at least one of the first and second sensors, and the threshold may include a temperature component (e.g., the threshold may be temperature dependent). In some calibration techniques, the stationarity of the device may be determined from sensor information or provided by a user, and may be used to in the calibration process.

The process at 303 may be expanded to detect an occurrence of a second user action at a second surface area on the housing 105 of the mobile device 100. For example, where the first surface area and second surface area are on opposite faces of the housing 105 of the mobile device 100, or where the first surface area and second surface area are on a common face of the housing 105 of the mobile device 100. The processor 130 may be used to determine an occurrence of a user action that includes a tilt of the mobile device 100. Such a detected tilt may be used as a control command from the operator to modify the display 150. For example, the processor 130 could interpret the command to pan or scroll an image on the display 150. For example, the image may be a map and the tilt could pan the image North/South and/or East/West depending on the detected direction of tilt. Alternatively, the image may represent a timeline, for example, a timeline of images. Tilting the mobile device 100 to the left may scroll the timeline to the left (or right) while tilting in the opposite direction could scroll the image in the opposite direction. Still lateral movement of the mobile device 100 could also be detected and interpreted to modify the display 150, for example, zooming an image in or out.

A mobile device 100 used to detect a tilt, as with the applications described below, could use a single dimensional or multidimensional gyroscope to detect a simple tilt of the mobile device 100. Additional dimensions though may be used to isolate a tilt from other user actions or other forces on the mobile device 100.

Figure 7A:
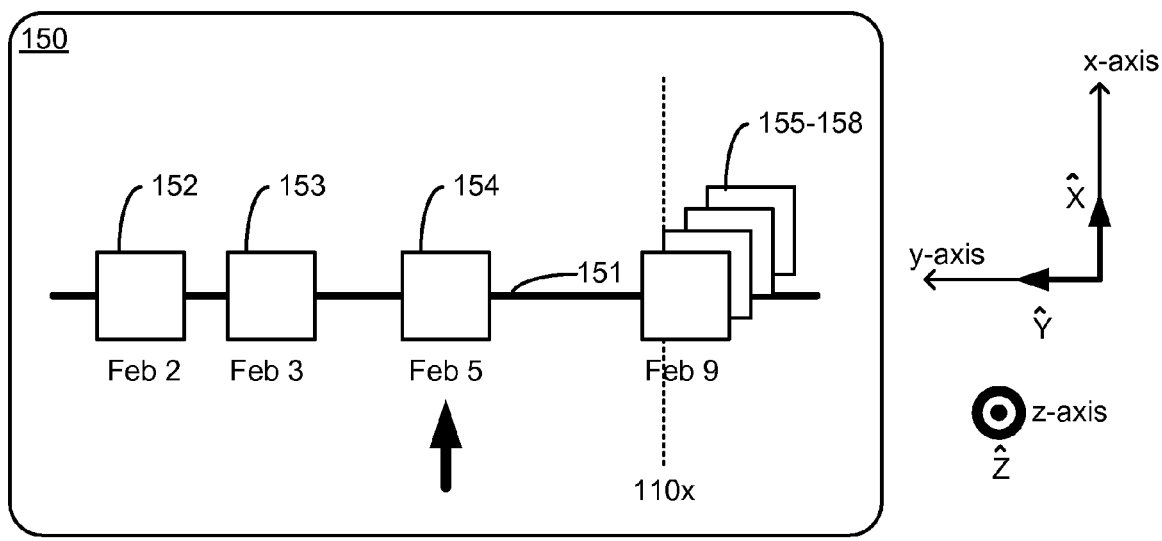
FIGS. 7A and 7B show scrolling of a display along a timeline.
Figure 7B:
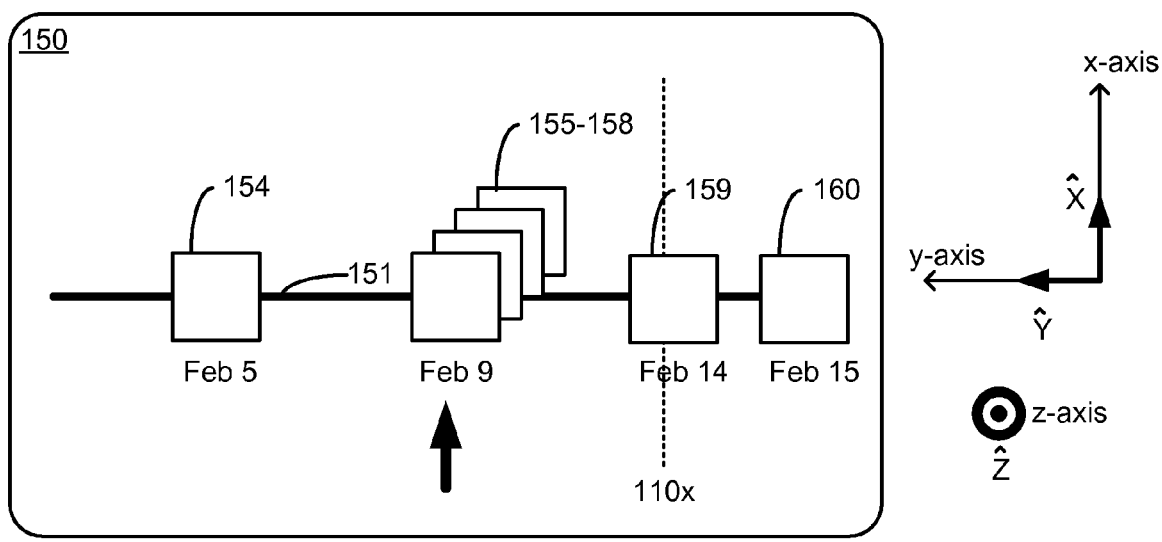

FIGS. 7A and 7B show scrolling of a display 150 along a timeline. FIG. 7A shows a display 150 with a timeline 151 including thumbnails of a series of photographs 152, 153, 154, 155-158. The display 150 shown is part of a handheld mobile device 100 that includes an accelerometer, which produces measurements indicative of angular movement about a first axis of a first sensor 110. This first axis may be along the x-axis 110x. To select an object shown on a display 150, the operator may tilt the mobile device 100 to the left and/or right until a particular object is centered. Once centered, the user may activate a virtual button or other input mechanism to select the image.

To detect and act on a tilt, the first sensor 110 measures motion and producing angular measurements indicative of angular movement about the first axis of a first sensor 110. The processor receives these angular measurements and determines whether a user action (e.g., a tilt to the left or right) has occurred based on the angular measurements. If the processor determines the mobile device 100 has been tilted, it may modify the display 150 to scroll the timeline and thus exposing thumbnail images of new photographs will hiding others. FIG. 7B shows a display 150 after the processor detected the tilt and scrolled the displayed image. Thumbnail images 152 and 153 have scrolled off the display 150 and new thumbnails 159 and 160 have scrolled onto the display 150.

Figure 8A:
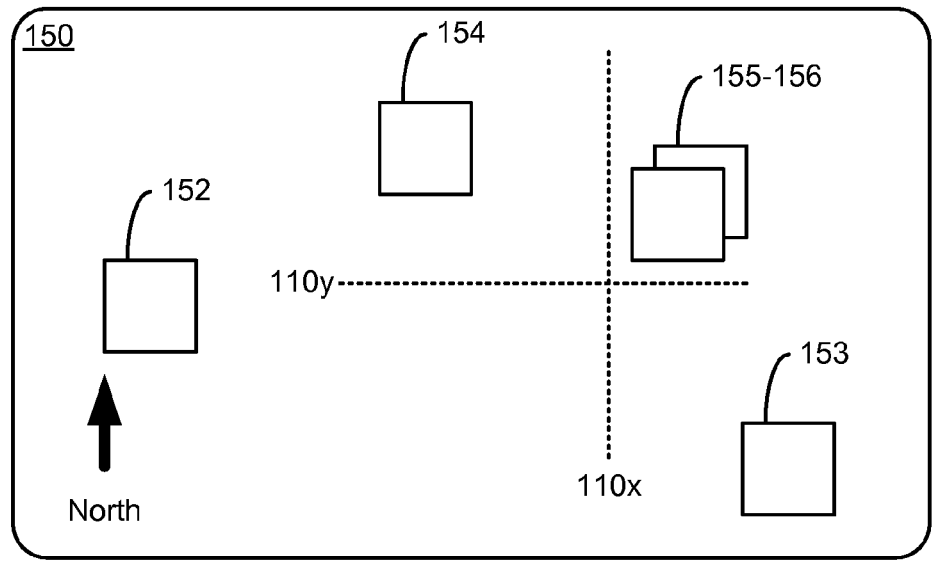
FIGS. 8A and 8B show panning of map on a display.
Figure 8B:
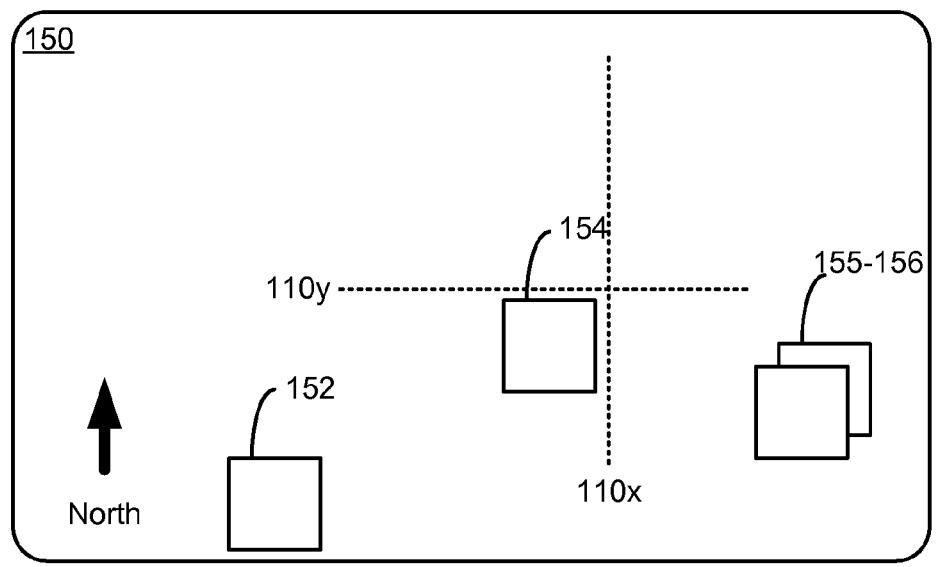

FIGS. 8A and 8B show panning of a map on a display 150. FIG. 8A shows thumbnails of five pictures 152-156, each located geographically on a map at the location where that picture was taken. Geographical data may be obtained at the time of photograph by a GPS receiver or other cellular based or assisted location methods. By tilting the mobile device 100 to the left and right about axis 110x (as described above) as well as forwards and backwards about axis 110y, a two-dimensional sensor may provide rotational measurements to the processor. The processor in turn detects the tilt and pans the geographic map of thumbnail pictures left and right as well as up and down to correspond to the detected tilt. In this case, the processor detected a tilt causing the map to scroll NWN (North-West-North) such that thumbnail 153 scrolled off the bottom right corner of the display 150.

Figure 9:
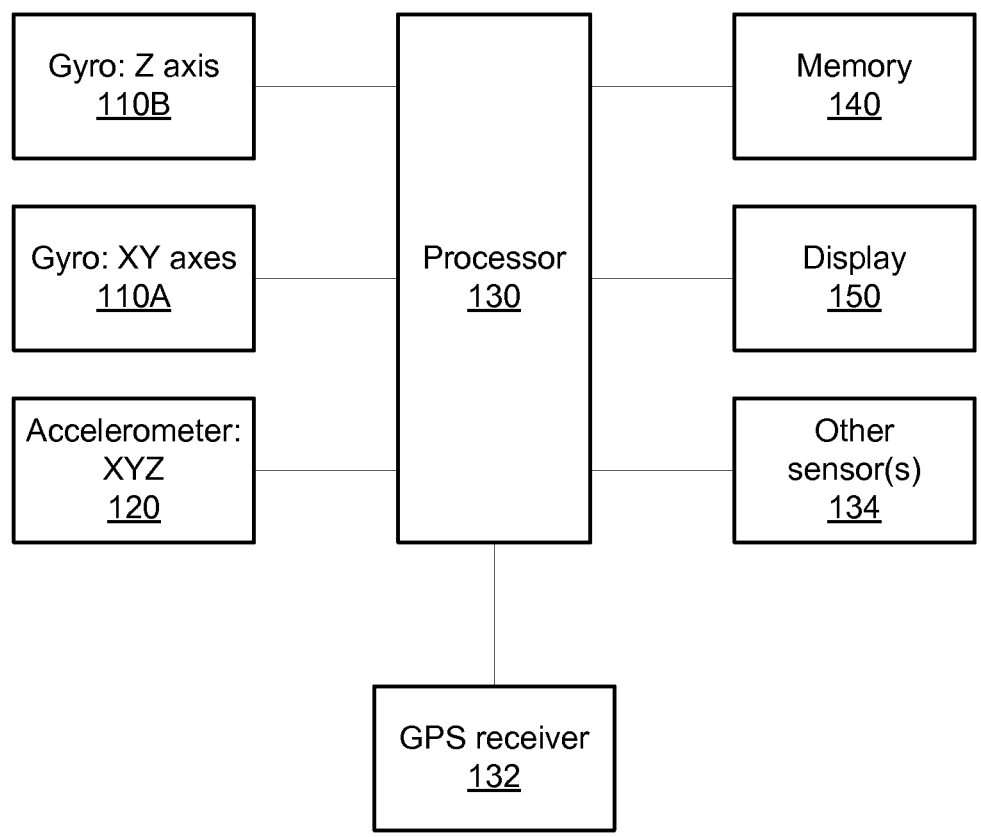
FIG. 9 is a block diagram of another handheld mobile device.

FIG. 9 is a block diagram of another handheld mobile device 100. The mobile device 100 (or multi-sensor measurement processing unit (MSMPU)) includes a processor 130 coupled to a two-dimensional gyroscope 110A (measuring about axes 110x and 110y), a one-dimensional gyroscope 110B (measuring about axis 110z) and a three-dimensional accelerometer 120 (measuring along 120x, 120y and 120z). The MSMPU also includes a GPS receiver 132, memory 140, a display 150 and possible one or more additional sensors 134, such as those listed above. Adequately sized one and two-dimensional gyroscope may be more readily available or may be provided at a lower cost than a three-dimensional gyroscope. A mobile device 100, using a combination of a two-dimensional gyroscope 110A with a one-dimensional gyroscope 110B, may position the two gyroscopes 110A and 110B within the same portion of the mobile device 100. For example, gyroscopes 110A and 110B may be positioned near, directly touching or on top of one another.

The above describes a number of embodiments; however, there are many possible implementations of a mobile device in which one or more motion sensors generate signals indicative of motion of the mobile device to detect user activation of one or more virtual buttons. The current disclosure provides a number of benefits not found in other techniques using sensors and/or dealing with user selection of buttons. For example, the current disclosure differs from available touchscreen implementations in that motion of the mobile device as a whole is used, rather than the types of interactions used with touch screens (e.g., electromagnetic, strain gauge, or other detection techniques). Virtual buttons using motion sensors can be implemented at lower cost, particular when the motion sensors have additional uses in the mobile device. Additionally, the user interaction with the virtual button is less likely to lead to degradation in performance over time, since the sensors are mounted securely in the mobile device and do not directly sense user interaction with a particular portion of a surface of the device. The current disclosure also differs significantly from motion sensor related devices used in (for example) game controllers. Motion detectors in mobile game controllers are not configured to determine activation of virtual buttons on the surface of the mobile device itself, rather, they are devices particularly designed to let the user interact with the game itself. However, in a particular embodiment of the current disclosure, virtual buttons may be implemented on a game controller to augment or replace existing mechanical buttons.

Therefore, it should be understood that the invention can be practiced with modification and alteration within the spirit and scope of the appended claims. The description is not intended to be exhaustive or to limit the invention to the precise form disclosed. For example, the above-described process could be used to detect a mobile device 100 being flipped over. The processor 130 could determine that an operator is muting a ringing phone if a flip is detected. Alternatively, a processor 130 could detect a shaking of the mobile device 100 and could enter a predefined mode of operation. It should be understood that the invention can be practiced with modification and alteration.

What is claimed is:

1. A mobile device to detect user selection of one or more virtual buttons, the mobile device comprising:
a housing comprising a first surface area associated with a first virtual button, wherein the first surface area is a subset of the complete surface area of the mobile device;
a first sensor comprising a first axis, wherein the first sensor is configured to generate a first sensor signal, wherein the first sensor signal is indicative of angular movement of the mobile device about the first axis of the first sensor;
a second sensor comprising a first axis, wherein the second sensor is configured to generate a second sensor signal, wherein the second sensor signal is indicative of linear movement of the mobile device along the first axis of the second sensor; and
a processor coupled to access information derived from the first sensor signal and coupled to access data derived from the second sensor signal, and to determine therefrom whether motion of the mobile device indicates user selection of the first virtual button, wherein a minimum sensitivity is needed to determine whether motion of the mobile device indicates user selection of the first virtual button, and wherein the first sensor is positioned at a selected distance and orientation relative to the second sensor, so that a lever arm between the first sensor and the second sensor is greater than or equal to a minimum lever arm associated with the minimum sensitivity.

2. The mobile device of claim 1, wherein the first axis of the first sensor and the first axis of the second sensor are substantially orthogonal to one another.

3. The mobile device of claim 1, wherein the first axis of the first sensor and the first axis of the second sensor are substantially parallel to one another.

4. The mobile device of claim 3, wherein the first axis of the first sensor and the second axis of the first sensor are substantially orthogonal to one another.

5. The mobile device of claim 3, wherein the first sensor further comprises a third axis different from the first axis of the first sensor and the second axis of the first sensor, and wherein the first sensor signal is further indicative of angular movement of the mobile device about the third axis of the first sensor.

6. The mobile device of claim 5, wherein the first axis of the first sensor, the second axis of the first sensor and the third axis of the first sensor are substantially orthogonal to one another.

7. The mobile device of claim 3, wherein the second sensor further comprises a third axis different from the first axis of the second sensor and the second axis of the second sensor, and wherein the second sensor signal is further indicative of linear movement of the mobile device along the third axis of the second sensor.

8. The mobile device of claim 7, wherein the first axis of the second sensor, the second axis of the second sensor and the third axis of the second sensor are substantially orthogonal to one another.

9. The mobile device of claim 1, wherein the first sensor further comprises a second axis different from the first axis of the first sensor, wherein the first sensor signal is further indicative of angular movement of the mobile device about the second axis of the first sensor.

10. The mobile device of claim 1, wherein the first sensor comprises a gyroscope.

11. The mobile device of claim 1, wherein the first sensor comprises an angular accelerometer.

12. The mobile device of claim 1, wherein the second sensor further comprises a second axis different from the first axis of the second sensor, wherein the second sensor signal is further indicative of linear movement of the mobile device along the second axis of the first sensor.

13. The mobile device of claim 1, further comprising a display, and wherein the mobile device is configured to update the display in response to a determination that the motion of the mobile device indicates selection of the first virtual button.

14. The mobile device of claim 1, wherein the second sensor comprises an accelerometer.

15. The mobile device of claim 1, wherein the housing further comprises a maximum linear dimension of the mobile device, and wherein a center of the first sensor and a center of the second sensor are separated by a linear distance greater than half of the maximum linear dimension of the mobile device.

16. The mobile device of claim 1, further comprising a user input interface, wherein the first sensor is positioned between the housing and the user input interface.

17. The mobile device of claim 1, wherein the first sensor is positioned in a first portion of the mobile device and the second sensor is positioned in a second portion of the mobile device, wherein the first portion is vertically displaced from the second portion.

18. The mobile device of claim 1, wherein the first sensor is positioned in a first portion of the mobile device and the second sensor is positioned in a second portion of the mobile device, wherein the first portion is laterally displaced from the second portion.

19. The mobile device of claim 1, wherein the mobile device includes a first board, and wherein the first and second sensors are positioned on the first board.

20. The mobile device of claim 1, wherein the mobile device includes a first board and a second board substantially perpendicular to the first board, and wherein the first sensor is position on the first board and the second sensor is positioned on the second board.

21. A mobile device including one or more virtual buttons, the mobile device comprising:
   a first sensing means for generating an output indicative of angular movement of the mobile device about a particular axis;
   a second sensing means for generating an output indicative of linear movement of the mobile device along a different axis;
   means for processing the output indicative of the angular movement of the mobile device about the particular axis and the output indicative of the linear movement of the mobile device along the different axis to determine therefrom whether motion of the mobile device indicates user selection of a first virtual button of the one or more virtual buttons, wherein a minimum sensitivity is needed to determine whether motion of the mobile device indicates user selection of the first virtual button, and wherein the first sensing means is positioned at a selected distance and orientation relative to the second sensing means, so that a lever arm between the first sensing means and the second sensing means is greater than or equal to a minimum lever arm associated with the minimum sensitivity; and
   means for implementing one or more actions based on determining that the motion of the mobile device indicates user selection of the first virtual button.

22. A method in a mobile device of processing user selection of one or more virtual buttons, the method comprising:
   detecting angular movement of the mobile device about a first axis of a first sensor using the first sensor;
   detecting linear movement of the mobile device along a first axis of a second sensor using the second sensor;
   determining that the angular movement of the mobile device and the linear movement of the mobile device indicate user selection of a first virtual button associated with a first surface area of a housing of the mobile device less than the complete surface area of the housing of the mobile device, wherein a minimum sensitivity is needed to determine whether motion of the mobile device indicates user selection of the first virtual button, and wherein the first sensor is positioned at a selected distance and orientation relative to the second sensor, so that a lever arm between the first sensor and the second sensor is greater than or equal to a minimum lever arm associated with the minimum sensitivity.

23. The method of claim 22, further comprising calibrating the first and second sensors, the act of calibrating comprising:
   generating an indicator that a user should select the first virtual button;
   in response to user response to the indicator, sensing initial angular movement of the mobile device using the first sensor;
   sensing initial linear movement of the mobile device using the second sensor;
   determining a first threshold based on the initial angular movement;

determining a second threshold based on the initial linear movement; and storing, in memory, the first threshold and second threshold.

24. The method of claim 22, further comprising calibrating the first sensor, the act of calibrating comprising:
determining stationarity of the device based on information generated by the second sensor;
determining at least one first threshold based on information generated by the first sensor; and
storing, in memory, the at least one first threshold.

25. The method of claim 24, wherein the first threshold is associated with the first axis of the first sensor.

26. The method of claim 25, wherein the first threshold is associated with a temperature value measured by or proximate to the first sensor.

27. The method of claim 26, wherein the first threshold and the temperature value are stored in memory.

28. The method of claim 22, further comprising calibrating the first and second sensors, the act of calibrating comprising:
determining stationarity of the device based on information provided by a user of the mobile device;
determining at least one first threshold based on the information generated by the first sensor; and
storing, in memory, the at least one first threshold.

29. The method of claim 22, wherein the user selection of the first virtual button comprises a tap at the first surface area on the housing of the mobile device.

30. The method of claim 22, wherein the user selection of the first virtual button comprises a plurality of taps at the first surface area on the housing of the mobile device.

31. The method of claim 22, wherein the user selection of the first virtual button comprises a stroke along the first surface area on the housing of the mobile device.

32. The method of claim 22, further comprising determining that the angular movement of the mobile device and the linear movement of the mobile device indicate user selection of a second virtual button associated with a second different surface area of the housing of the mobile device less than the complete surface area of the housing of the mobile device.

33. The method of claim 32, wherein the first surface area and second surface area are on opposite faces of the housing of the mobile device.

34. The method of claim 32, wherein the first surface area and second surface area are on a common face of the housing of the mobile device.

35. A computer-readable product comprising instructions stored on a non-transitory computer-readable medium, wherein the instructions are to cause one or more machines to perform operations comprising:
accessing data indicative of angular motion of a mobile device about one or more axes;
accessing data indicative of linear motion of a mobile device along one or more axes;
processing the data indicative of angular motion and the data indicative of linear motion to determine if user selection of a virtual button is indicated, wherein a minimum sensitivity is needed to determine whether motion of the mobile device indicates user selection of the virtual button, and wherein a first sensor is positioned at a selected distance and orientation relative to a second sensor, so that a lever arm between the first sensor and the second sensor is greater than or equal to a minimum lever arm associated with the minimum sensitivity;
in response to determining that user selection of a virtual button is indicated, generating an output associated with the virtual button.

36. The non-transitory computer readable medium product of claim 35, wherein processing the data indicative of angular motion and the data indicative of linear motion to determine if user selection of a virtual button is indicated comprises comparing the data indicative of angular motion to a first threshold and comparing the data indicative of linear motion to a second threshold.

37. A mobile device comprising:
a defined virtual button area associated with a virtual button, wherein the defined virtual button area is a portion of the surface area of the mobile device less than the complete surface area of the mobile device;
one or more motion sensors included in the mobile device, wherein the one or more sensors are configured to generate a signal indicative of motion of the mobile device; and
control logic to process information based on the signal indicative of the mobile device to determine if the motion of the mobile device indicates selection of the virtual button, wherein a minimum sensitivity is needed to determine whether the motion of the mobile device indicates selection of the virtual button, and wherein a first motion sensor of the one or more motion sensors is positioned at a selected distance and orientation relative to a second motion sensor of the one or more motion sensors, so that a lever arm between the first motion sensor and the second motion sensor is greater than or equal to a minimum lever arm associated with the minimum sensitivity.

38. The mobile device of claim 37, wherein the control logic comprises software, hardware, firmware, or a combination.

39. The mobile device of claim 37, wherein the one or more motion sensors comprise at least one accelerometer and at least one gyroscope.

* * * * *